US011461732B2

(12) United States Patent
Thompson et al.

(10) Patent No.: US 11,461,732 B2
(45) Date of Patent: Oct. 4, 2022

(54) LOGISTICS APPARATUS AND METHOD TO ASSIST DELIVERY OF ITEMS TO RECIPIENTS

(71) Applicant: Ford Global Technologies, LLC, Dearborn, MI (US)

(72) Inventors: Tom Robert George Thompson, Brentwood (GB); Angela Fessler, Royal Oak, MI (US); Phil Danne, Royal Oak, MI (US); Ruth Tilsley, London (GB); Gabor Bakler-Kugler, Billericay (GB); Ahmad Jasim, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 17/003,975

(22) Filed: Aug. 26, 2020

(65) Prior Publication Data

US 2021/0065114 A1   Mar. 4, 2021

(30) Foreign Application Priority Data

Aug. 27, 2019   (EP) .................................... 19193929

(51) Int. Cl.
*G06Q 10/08* (2012.01)
*G06F 3/0482* (2013.01)
(Continued)

(52) U.S. Cl.
CPC ..... *G06Q 10/08355* (2013.01); *G06F 3/0482* (2013.01); *G06F 3/0483* (2013.01);
(Continued)

(58) Field of Classification Search
CPC ....... G06Q 10/08355; G06Q 10/06312; G06Q 10/06316; G06Q 10/0838; G06Q 10/103; G06Q 10/1093; G06Q 50/01; G06Q 10/0837; G06Q 10/083; G06Q 10/0833; G06Q 50/28; G06Q 50/30; G06Q 10/047;
(Continued)

(56) References Cited

U.S. PATENT DOCUMENTS

| 10,181,111 B1* | 1/2019 | Kohli ..................... G01S 5/0027 |
| 2014/0026088 A1* | 1/2014 | Monte ................. G06F 3/04855 |
| | | 715/765 |

(Continued)

*Primary Examiner* — John T Repsher, III
(74) *Attorney, Agent, or Firm* — Brandon Hicks; Eversheds Sutherland (US) LLP

(57) ABSTRACT

A logistics apparatus for a user to assist delivery of items to recipients situated at different recipient locations. The logistics apparatus has access to an overall schedule of deliveries for agents acting as parent and delivery agents, with each item represented as a record, wherein each parent agent has a parent cluster of records allocated to it for a first transport stage along a route to a hub position, and the records in each parent cluster are further clustered according to recipient location into one or more child clusters for a second transport stage, each child cluster being allocated to a delivery agent which operates along a route from the hub position of the parent agent and delivers at recipient locations. The overall schedule includes an individual schedule for each agent with events and locations and timings for the events.

12 Claims, 29 Drawing Sheets

(51) Int. Cl.
*G06F 3/0483* (2013.01)
*G06F 3/04845* (2022.01)
*G06F 3/0486* (2013.01)
*G06F 16/29* (2019.01)
*G06Q 10/06* (2012.01)
*G06Q 10/10* (2012.01)
*G06Q 50/00* (2012.01)

(52) U.S. Cl.
CPC ........ *G06F 3/0486* (2013.01); *G06F 3/04845* (2013.01); *G06F 16/29* (2019.01); *G06Q 10/06312* (2013.01); *G06Q 10/06316* (2013.01); *G06Q 10/0838* (2013.01); *G06Q 10/103* (2013.01); *G06Q 10/1093* (2013.01); *G06Q 50/01* (2013.01); *G06Q 10/0837* (2013.01)

(58) Field of Classification Search
CPC ............ G06Q 10/06313; G06F 3/0482; G06F 3/0483; G06F 3/04845; G06F 3/0486; G06F 16/29
See application file for complete search history.

(56) References Cited

U.S. PATENT DOCUMENTS

| | | | | |
|---|---|---|---|---|
| 2018/0285806 A1* | 10/2018 | Scofield | ................. | G06Q 10/08 |
| 2019/0212157 A1* | 7/2019 | Wu | ........................ | H04W 4/40 |
| 2020/0005240 A1* | 1/2020 | Ko | ....................... | G06Q 10/047 |
| 2020/0380467 A1* | 12/2020 | Chen | ....................... | B32B 21/10 |

* cited by examiner

LOGISTICS APPARATUS AND METHOD TO ASSIST DELIVERY OF ITEMS TO RECIPIENTS

CROSS-REFERENCE TO RELATED APPLICATIONS

The present disclosure claims priority to and the benefit of EP Patent Application No. 19193929.7, filed Aug. 27, 2019, which is hereby incorporated by reference herein in its entirety.

FIELD

The present invention relates to a computer-implemented logistics apparatus and method with a Graphical User Interface, GUI, to assist delivery of items (physical goods such as parcels/packages purchased using the internet) to recipients (such as customers or consumers). It has wide applicability in enhancing delivery of goods to business or individuals, particularly in urban scenarios.

BACKGROUND

Prior art goods delivery uses traditional motor vehicles, such as vans. An individual van driver is allocated parcels for delivery in a defined geographical delivery area. He or she packs the van with parcels at a depot (distribution centre). For ease of extraction, the driver loads the parcels into the van onto a simple loading platform in the van. The van driver generally has a preferred route to and through the delivery area which he or she follows for delivery every day, stopping the van and unloading a parcel (or parcels) at each consumer delivery location. The route to the delivery area may be straightforward, but the travel within a delivery area (in the so-called "last mile" before delivery) and delivery process is time consuming and inefficient. In general, the driver navigates to the next delivery location, parks the van somewhere nearby, unloads the parcel from its position on the van rear loading platform, takes it for delivery to the consumer, and then walks back to the van's parking position.

This delivery process can be effective in low-traffic conditions and with abundant parking opportunities, but as soon as the delivery vehicle enters an area with a high traffic volume and/or low availability of parking spaces, the delivery rate slows considerably. This delay in the end-phase renders the whole delivery process inefficient and expensive. This is particularly irksome for time-sensitive deliveries, such as food deliveries. Moreover, the delivery vehicles contribute to increasing levels of local pollution and street crowding.

Today's consumers tend to purchase goods over the internet, for delivery at a preferred location (such as at the office or at home). The number of goods shipments worldwide is thus increasing dramatically, as it takes over from direct purchasing at retail outlets. At the same time, consumers expect radically shorter delivery times and low or zero delivery cost. There is also a dramatic increase in food and drink deliveries, directly from suppliers, and from third-party delivery agencies which offer a choice of food and drink from different suppliers. This conjunction of factors puts pressure on traditional deliveries and on the transport systems, such as the road network, in our cities. Particularly urban van journeys and curb usage is continuously increasing.

Moreover, in any more automated process which does not rely on driver knowledge, there is a need to instruct the delivery process efficiently.

SUMMARY

Embodiments of the invention aim to mitigate the effects of consumer demand on urban transport system and provide a more sustainable method of delivering items to recipients, whilst providing GUI delivery instructions about the technical delivery system and GUI input functionality for the user to adapt the GUI to requirements.

According to one aspect, there is provided a logistics apparatus for a user to assist delivery of items to recipients situated at different recipient locations, the logistics apparatus comprising memory and a processor to execute a graphical user interface GUI which is displayed on a display and linked to user input means wherein:

the logistics apparatus has access to an overall schedule of deliveries for agents acting as parent and delivery agents, with each item represented as a record, wherein each parent agent has a parent cluster of records allocated to it for a first transport stage along a route to a hub position, and the records in each parent cluster are further clustered according to recipient location into one or more child clusters for a second transport stage, each child cluster being allocated to a delivery agent which operates along a route from the hub position of the parent agent and delivers at recipient locations;

the overall schedule includes an individual schedule for each agent with events and locations and timings for the events, wherein the events include travel events in which the agent is travelling along a route and stop events in which the agent is carrying out any of the following stop actions: delivering items, transferring items between agents and waiting; and wherein the GUI is to control the display to display an individual schedule in the form of:

a schedule view in which a time sequence of events is displayed, including an indication of scheduled event timing; and a map view in the form of a map overlaid with stop event locations and travel event routes; wherein when there is a user selection via the user input means of an event in the schedule view and/or when there is a user selection via the user input means of an event in the map view, the GUI is to control the display means to display an event view including details of the event.

The items are then delivered according to the individual schedule information provided to each parent and delivery agent.

The inventors have found that a new paradigm for delivery can be implemented in software, which not only substantially reduces road usage by delivery vans in built-up urban areas, but also improves delivery times by reducing delays using individual scheduling of agents used in the delivery process. Moreover, the new paradigm is well suited to advances in technology such as delivery by automated agents such as drones and self-driving (autonomous) vehicles. A GUI may be provided for non-automated (human) agents.

The new paradigm can use a "hub and spoke" method with a parent agent taking items to a hub position and then child agents each taking a subset of the items from the hub position to the recipient locations. In this way, the parent agent can stop at a convenient hub position (for example which is approximately central for all the recipient locations) and the child agents can receive their subset for local delivery from the hub.

The delivery agent(s) may meet the parent agent again later at the same or a different hub location, to receive a further load, possibly from the same child cluster, as explained below. The second hub location may be specific to a single delivery agent or shared by two or more delivery agents. The items for delivery by each delivery agent and the order of delivery may be predetermined, as explained in more detail below.

Alternatively (and with the same predetermined order of delivery) the paradigm can use a "corridor" method in which the delivery van drops loaded bags/compartments at a safe place, such as a storage locker or manned location or premises such as a newsagent, parcel shop or other local shop for the couriers to pick up. In this case, the position of the safe place is predetermined.

The parent agent may be a delivery van or lorry, truck or motorcycle with a driver, or other initial transport means, such as a marine vessel, aircraft or any other type of vehicle such as a self-driving vehicle, drone or conveyor (which in this case does not require a GUI). If there is more than one parent cluster, different initial transport means may be used (but only one is used in each parent cluster).

The delivery agent (in the child cluster) may include a more local transport means, which is preferably less subject to urban traffic than the initial transport means, such as drones, robots (which do not require a GUI) or wheeled user-vehicles with their users like e-bikes, bicycles, scooters or powered or unpowered trolleys or handcarts, which are smaller than vans and may be useable in pedestrian areas/walkways/paths which are not suitable for the conventional (usually four-wheeled) delivery vehicles which may range in size from small cars to large vans. Different local transport means may be used for different child clusters.

The method creates an individual schedule for each parent and delivery agent with events and timings for the events. This allows the agents to be individually instructed by a GUI on an agent mobile device (or logistics apparatus) for enhanced flexibility and ease of use. A similar GUI may also be used for a fleet manager.

Specifically, the GUI includes a schedule view with a time sequence of events, including an indication of scheduled event timing. This is the minimum information and additional information may include the type of events: travel events in which the agent is travelling along a route (go to events) and stop events in which the agent is carrying out any of the following stop actions: delivering items, transferring items between agents and waiting.

The GUI also includes a map view in the form of a map overlaid with stop event locations and travel event routes. The route of a single agent may be shown, for example using a GUI for a delivery agent, or two or more routes may be shown when the delivery agent is to meet another agent, for instance for a transfer. A GUI used for a parent agent may show the route of the parent agent and all the delivery agents which have child clusters transported within that parent agent. A GUI used for a central management function may show all the routes, or a selection of routes relevant to a user input, such as selection of an event.

User input, whether in the schedule view or in the map view, controls the display means to display an event view including details of the event. This simple mechanism is not only coherent across the different views, but also quickly reveals underlying information once the events have been displayed in a wider context of time sequence (schedule view) and/or spatial sequence (map view).

The GUI may provide a set of one or more pages, each with one or more with selectable buttons (areas on the display which can be selected by the user to create an action) to view further information. A selectable button may be selected to send a message to other users. In this case, the message may appear as a pop-up window on a display of another logistics apparatus. For example, a parent agent may send a message to the whole team (including the delivery agents and any manager) that there are traffic delays or other real-time circumstances that might affect the deliveries. A delivery agent may send the same type of message.

The GUI may include indications in the form of icons for the different events. A delivery icon may include a downward arrow. A pick-up icon (explained in more detail later) may include an upward arrow. A transfer icon may include a horizontal double-headed arrow or two horizontal vertically-offset arrows pointing to each other. A wait icon may include a clock face. The icons and other colouring in the GUI (or in a set of GUI for different team members) may be highlighted differently according to whether they have been completed, are the next action to be completed or are a further stop in the future, using colour or shading for example.

If a transfer location is changed (as explained later), this may cause an automatic pop-up window alerting the agents participating in the transfer of the changed location.

The logistics apparatus may be a computing device, such as a terminal, laptop, iPad or other tablet/touchscreen computer, mobile phone or Personal Digital Assistant, PDA. The user may be a parent agent or delivery agent or a manager of the delivery process, perhaps based at a distribution centre.

The map may also be overlaid with real-time positions of the parent and delivery agents (or at least of the agent for the delivery agent's GUI). This allows an excellent overview of the delivery process. A screen with positions of all the team may be provided at a central depot, for example. A simpler screen may be provided for a parent or delivery agent and show the path of that agent only. Advantageously, the agent may be able to swap between the simpler screen and a view including other agents.

The schedule may comprises a pick-up event as a further stop action. That is, the system may operate to accommodate collections (picking up items) as well as deliveries, as explained in more detail later.

In one embodiment, the logistics apparatus is for operation by a parent agent or a delivery agent. In this case, the logistics apparatus is likely to be a tablet or mobile phone. The display and user input means may be formed together by a touchscreen controlled by the GUI The schedule view may be presented as an individual schedule page displayed on the display means. The GUI may accept selection of a selectable map button to click through to the map view as a map page. The event on the individual schedule page and/or the map page may act as an event button to open the event view as an event page. This simple page structure is easy to use and intuitive for the agents. It may be fronted by a welcome page, which the agent clicks through to land initially on the individual schedule page, which is for that agent.

The individual schedule page may include both the time sequence, displayed as a viewed or current event and adjacent events and an abstraction of the schedule in a full delivery period. The viewed event and adjacent events may each include an icon, textual information such as timing, instructions, and potentially an address. The abstraction may include a (thinner) line of unlabeled sections representing events and demarcated by colour for example The line may extend in the same direction across the display as the (thicker) line of viewed event and adjacent events. It may also include a marker, the abstraction allowing the user to move around the time sequence in a full delivery period by dragging the marker to an event. Hence where the time sequence is incomplete and does not show all the information for a delivery period (day or shift, for example), the abstraction can be used for navigation. It may use the same colours as a colour scheme set up for the different types of event in the time sequence and elsewhere in the GUI. A selectable button may be provided to take the view back to a current event.

The event page and/or individual schedule page may include a selectable button to click through to the map page, for example with the text "view map" or "show on map".

The event page may include a selectable button to start an event. For example, the event page for a parent agent transfer may show a "start now" button which allows a parent agent to indicate completion of a transfer. The event page for a delivery may show a "start now" button which allows the delivery agent to enter delivery data (or pick-up data) on a data page. The go to page for a delivery agent or parent agent may show a "start now" button which switches to a page of navigation instructions. This navigation page may retain the card for the go to event.

Thus GUI may also provide a data page with a user input field for the delivery agent to enter a notification when a stop action (such as a delivery or a pick up) has been completed and/or a user input field for a recipient to enter a signature.

Also, if there is a second delivery stop action entered (notified by the delivery agent as mentioned above) within a predetermined time of a first delivery stop action (for example two minutes), the GUI may display a message (such as in a pop-up window or selectable button on the data page) asking the delivery agent if the two stop actions are part of the same delivery. If the agent inputs a confirmation, any signature from the recipient may be copied across from the first to the second delivery to confirm receipt. This is a quick and efficient way of dealing with multiple parcel deliveries (for example to a concierge) and allows ad-hoc addition of further items.

The GUI, and in particular the data page, may also allow point of delivery information and feedback from the recipient to be entered in a feedback field. The logistics apparatus may also automatically collect point of delivery information.

The map page may include a card (or banner) to one side of the map, displaying a selected event. The card may include textual information, and an icon and potentially timing and/or distance information as appropriate. This card may be part of a string (time sequence) of cards representing the schedule, and the GUI may be operable by the agent to view the next card to see an adjacent event. For example, the agent may "swipe" the card on a touch screen or using a mouse to previous or subsequent events, which are then highlighted on the map. The map page may include a selectable button to return to the current event (in real time)

Team members participating in a selected event may be shown on the display, preferably as part of the card, for example as one photograph per team member.

There may be one GUI type per agent type, with the delivery agents using a smaller format GUI on a mobile phone and the parent agents using a tablet.

In some embodiments, the logistics apparatus is for operation by a manager, who is likely to have access to a larger screen. In this case, the schedule view and map view may be presented together as a single overview page displayed on the display means. The GUI may accept user (manager) input to open the event view as a movable pop-up window (and without a change of page). Concurrent presentation of the schedule and map view with the optional addition of the event view allows not only two viewpoints of the schedule as the deliveries progress but also enhances functionality as explained below.

The schedule view on the overview page may show the timelines of the individual agents. A visual connection between particular agent timelines may indicate a transfer involving those particular agents. For example, a vertical bar of colour on the display may link two horizontal individual schedules of a parent agent and a delivery agent at the time when the parent agent transfers a compartment to the delivery agent. Alternatively, the bar of colour may be horizontal and the individual schedules may be vertical.

Advantageously, a transfer location in the map view may be moveable to a different location, for example using drag-and-drop. This allows flexibility in re-positioning a transfer, for instance in response to a message that there is a traffic jam. A network interface of the manager's apparatus (or a transceiver if the apparatus is mobile) may send the different location to agents' logistics apparatuses. This information may be sent selectively to agents involved in the transfer. A new route and/or new timings may be calculated and sent to the agents involved. An alert may be triggered to warn the agents of the different location when change of location is for the current event.

In order to assist the manager, nearby previously successful transfer locations may be displayed (on the map) to assist the manager in selecting a different location.

Selection of a delivery on the schedule view may highlight the route of the selected item for delivery on the map and selection of a delivery on the map view may highlight the route of the selected item for delivery on the map in the same way. This allows the manager two interchangeable ways of highlighting the route to a delivery, both of the parent agent and of the delivery agent.

Selection of a transfer event on the schedule view may highlight all agent positions and routes involved in the transfer and selection of a transfer event on the map view may highlight all agent positions and routes involved in the transfer in the same way. Again, the manager is provided with alternatives to view a transfer more closely on the map.

In all the embodiments, the GUI may display an updated schedule (in all the various GUI views) if there are real-time updates. The GUI may also inform the parent agent (for example with a pop-up message on whatever page is being displayed at that time) when a delivery agent is a predetermined amount of time away from a location where the parent agent is meeting the delivery agent, so the parent agent can gain an idea of the delivery agent's progress. As a result of such updates, the parent agent may decide to modify their course to deviate from a planned delivery route (for example to deliver another item rather than proceeding directly to a transfer location if the delivery agent is running late).

A system may be provided to carry out the assisted delivery method. For example, a set of logistics apparatuses may include two or more logistics apparatuses for agents as described above, and an optional logistics apparatus for a manager as described above. A server may be provided if required, to carry out the calculation and storage of the clustering and scheduling. The calculation and storage may be hosted on the internet.

Another aspect provides a computer-implemented method of assisting delivery of items to recipients situated at different recipient locations using a logistics apparatus comprising memory and a processor to execute a graphical user interface GUI which is displayed on a display and linked to user input means, the method comprising:

accessing an overall schedule of deliveries for agents acting as parent and delivery agents, with each item represented as a record, wherein each parent agent has a parent cluster of records allocated to it for a first transport stage along a route to a hub position, and the records in each parent cluster are further clustered according to recipient location into one or more child clusters for a second transport stage, each child cluster being allocated to a delivery agent which operates along a route from the hub position of the parent agent and delivers at recipient locations;

accessing an individual schedule included in the overall schedule, an individual schedule being provided for each agent with events and locations and timings for the events, wherein the events include travel events in which the agent is travelling along a route and stop events in which the agent is carrying out any of the following stop actions: delivering items, transferring items between agents and waiting; and the GUI controlling the display to display:

a schedule view in which a time sequence of events is displayed, including an indication of scheduled event timing; and a map view in the form of a map overlaid with stop event locations and travel event routes; wherein the user input means accepts user selection of an event in the schedule view and/or the user input means accepts user selection of an event in the map view, and the GUI controls the display means to display an event view including details of the event.

According to a further aspect of the invention, there is provided a computer program which when loaded onto the at least one computer configures the at least one computer to carry out the method steps according to any of the preceding method definitions or any combination thereof. The program may execute locally or on the cloud.

A computer system may comprise the logistics apparatus in the form of mobile devices such as smartphones, tablet computers or PDAs for use by the agents (for example including the GUI functionality mentioned above). Each mobile device includes a least a processor, memory and a transmitter/receiver to receive instructions and pass data back to the logistics apparatus. A manager may be provided with a web application on a fixed terminal with a network interface and an agent may be provided with a mobile application on a mobile device (such as an IOS application on an iPhone or iPad or an Android application on other smartphones or a suitable operating system on a digital assistant of any preferred type).

A method according to preferred embodiments of the present invention may comprise any combination of the apparatus (or computer system) or computer program aspects. Methods or computer programs according to further embodiments may be described as computer-implemented in that they require processing and memory capability.

The apparatus according to preferred embodiments is described as configured or arranged to, or simply "to" carry out certain functions. This configuration or arrangement could be by use of hardware or middleware or any other suitable system. In preferred embodiments, the configuration or arrangement is by software.

Thus according to one aspect there is provided a program which, when loaded onto at least one computer configures the computer to become the logistics apparatus according to any of the preceding apparatus definitions or any combination thereof.

In general the computer may comprise the elements listed as being configured or arranged to provide the functions defined. For example a central computer may include memory, processing, and a network interface, as well as a further input device and display.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions (such as GUI instructions) and data.

The invention is described in terms of particular embodiments. Other embodiments are within the scope of the following claims. For example, the steps of the invention may be performed in a different order and still achieve desirable results. Multiple test script versions may be edited and invoked as a unit without using object-oriented programming technology; for example, the elements of a script object may be organized in a structured database or a file system, and the operations described as being performed by the script object may be performed by a test control program.

Elements of the invention have been described using the terms "processor", "memory", "input means" etc. The skilled person will appreciate that such functional terms and their equivalents may refer to parts of the system that are spatially separate but combine to serve the function defined. Equally, the same physical parts of the system may provide two or more of the functions defined. For example, separately defined means may be implemented using the same memory and/or processor as appropriate.

BRIEF DESCRIPTION OF THE DRAWINGS

Preferred features of the present invention will now be described, purely by way of example, with references to the accompanying drawings, in which:—

FIG. 11 is an example of a digital item manifest according to one example;

FIG. 12 is an example of a generated delivery/logistics schedule according to one example;

DETAILED DESCRIPTION

Figure 1A:
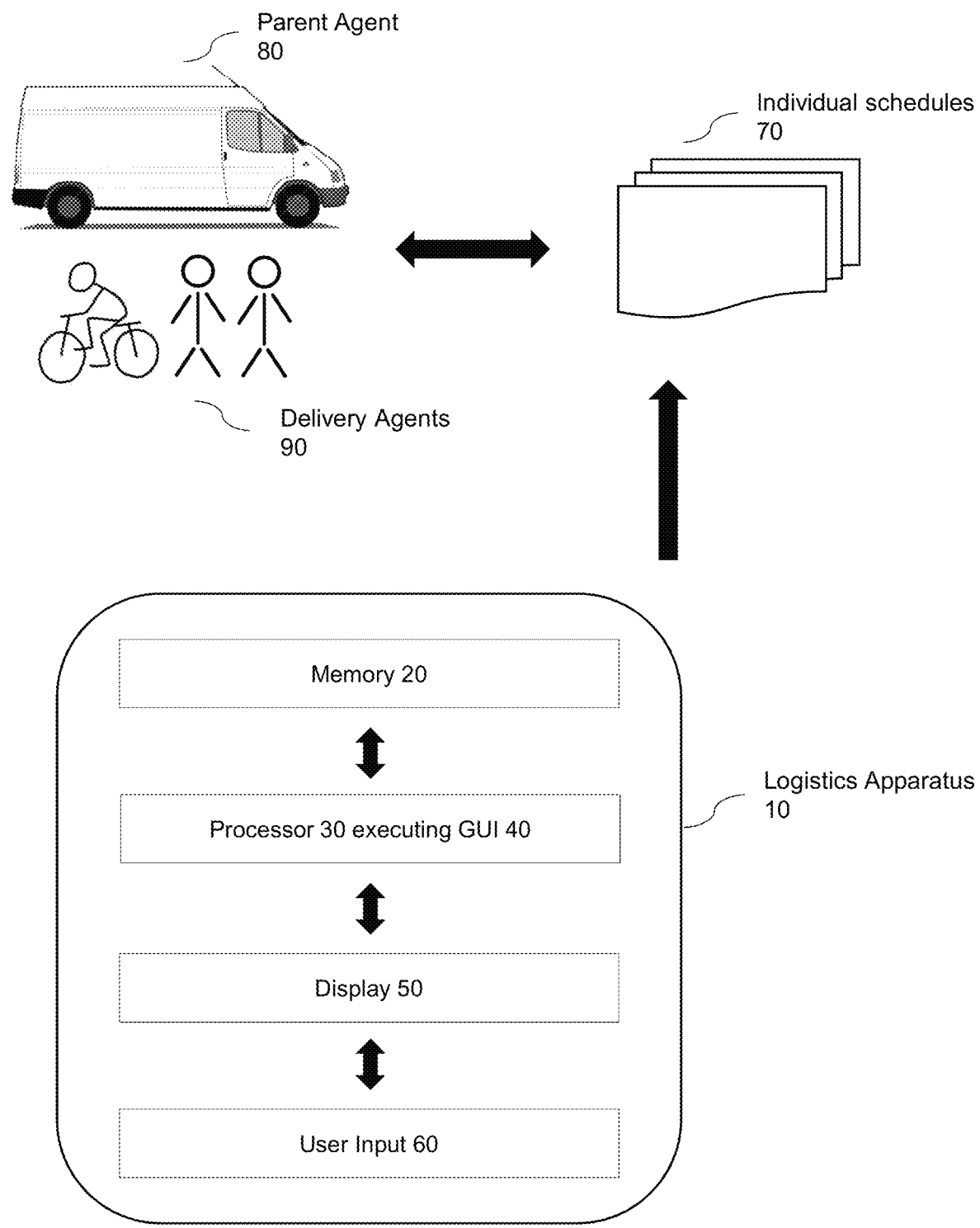
FIG. 1a is a schematic diagram of a logistics apparatus to assist delivery of items to recipients situated at different recipient locations.

Embodiments include clustering of the items/records into parent and child clusters and scheduling within the system. Hence an overview of possible clustering and scheduling methodology is given below.

Clustering

Items are clustered into parent clusters if necessary, and into child clusters, which are received in compartments, for transfer to delivery agents. One embodiment may include marking the items according to their (parent, if necessary, and) child cluster and delivery order using the records, allowing transfer of the items into compartments (one per child cluster) in the delivery order into the corresponding parent agent.

Each compartment may receive a complete child cluster, or the cluster may be divided into two (or more) compartments, if it is too large for one compartment and the second compartment will then be received by the delivery agent from the parent agent at a later stage. In this scenario, the skilled reader will appreciate that a mixed methodology may be used, for example, with a first hub drop-off and subsequent corridor drop-offs from the parent agent, or vice versa.

The items are recorded at a distribution centre to provide a record for each item (for example by scanning a code on each item, or by receiving a digital manifest, or even by matching a set of scans to a digital manifest). The record includes at the least an item identification and a recipient location. The records are then processed by the software as follows.

The records are clustered according to location of the recipient into one or more parent clusters. If there is a single parent agent, there is a single parent cluster of all the items. The (or each) parent cluster is allocated to a (different) parent agent for a first transport stage.

A hub position is located for each parent cluster according to recipient locations of the records in the parent cluster. The hub position may be central (or approximately central) in the geographical distribution of the recipient locations, or may be at the recipient location which is closest to the centre of the geographical distribution, in which case one delivery agent is already at the first recipient location.

Alternatively, the hub position may be based on recipient locations of records in a cumulative parent cluster formed from the parent clusters for a specific area over successive periods of time (for example, covering the days of one week). For example, the parent clusters may be determined by postcode and the "same" parent cluster formed on each successive day may be specific to one or more postcodes. In this case, the hub position may be central, or approximately central within the cumulative parent cluster for the postcode(s).

When the hub position is approximately central, it may be derived from a central position by looking for a position that is within a radius from the central position and which fulfils one or more criteria. For example, the method may select a hub position within the radius that is present (or preferred) in a parking spaces database, or that has been used as a hub before on a predetermined number of occasions, or use some other criterion.

One or more child clusters are then formed for a second transport stage, by clustering the records in each parent cluster according to recipient location. Essentially, each child cluster contains records for items which can be grouped together as a local geographic group.

Embodiments make use of a compartment for each child cluster, which may be a physical bag (containing a bundle of items) or other container. These compartments are to be delivered from the parent agent to the delivery agent (for example by loading all the bags (one per child cluster) onto the loading surface of a delivery van). For each child cluster, the records in the child cluster are allocated to a compartment of a selected delivery agent which operates from the hub position of the parent agent and delivers the items at the recipient locations.

The software may calculate a child cluster delivery route for the selected delivery agent and thus also a delivery order of the items in the child cluster delivery route. This delivery order has the benefit that it allows the items to be marked according to their child cluster and delivery order using the records and transferred into the compartments in the delivery order and into the corresponding parent agent. The marking may be manual, with a user transferring the child cluster and delivery order information in manuscript onto the item and then loading into the compartments also being manual.

Alternatively, the marking may be a simple change to the records themselves. If the items are tracked and potentially also loaded into the compartments by an automatic system, then a visual inspection system can scan any codes (such as bar codes) on the items and identify the corresponding record, allowing the item to be packed into the correct compartment in the correct order, potentially by displaying the child cluster and delivery order information to a user on a screen, or by automatically packing the items in the correct order into the correct compartment using an ordering conveying system or robot. The automatic calculation of the delivery order (in addition to the provision of the child cluster) and transfer into the compartment in this order is a significant benefit to the delivery agent, avoiding a biker or walker wasting time in searching for the right parcel and allowing a drone or robot or other automatic delivery agent to straightforwardly eject the next item from the compartment.

If there is more than one parent cluster, the items can also be marked according to their parent cluster using the records, in the same way as set out above.

Finally, delivery is made by the combination of the parent agent and delivery agent, based on their individual schedules (whether read by a human user controlling the agent or by an automatic vehicle), for example by navigating (or providing instruction for navigation of) the parent agent to the hub position, transferring the compartments to the one or more delivery agent and by navigating each delivery agent from the hub position to the recipient locations in the delivery order. In either or both legs of the delivery journey, the navigation can be fully automatic, for example, for when used by drones or conveyor systems or self-driving vehicles, or it may be semi-automatic, when provided as a guide to a human user. The delivery agent may obtain a signature or other input from the recipient, before reporting a completed delivery.

The skilled reader will appreciate that there is one record per item and the clusters may be said to be of items or of the records of items, since the records are merely a convenient informational representation of the items (each in a form, for example, of one line of a spreadsheet of data). For simplicity, the remaining description uses the terms items and records synonymously in the context of information processing . . . .

Advantageously, one or more items are selected for delivery by the parent agent and the corresponding record is not allocated to a child cluster. The parent agent can attend to some deliveries without use of a further delivery agent, which can lead to improved time efficiency and add flexibility to the method by catering for different scenarios, as explained in more detail below.

The parent clusters may be formed using any techniques which groups the records according to geographic distribution of the recipient locations to form clusters in which the locations are close together. One example of a suitable spatial clustering technique is Density-Based Spatial Clustering of applications with noise, DBSCAN. Such techniques may be used to group together records with recipient locations that are more closely packed and mark as outliers any records with recipient locations that lie alone, the outliers being allocated to the parent agent for delivery. In this scenario, one or more outliers will not be further distributed into a child cluster. This not only provides an occupation for the parent agent while the child agents are delivering but also avoids "over-stretching" the local transport means by delivering items that are too far away from the hub location.

Furthermore, the parent clusters may be filtered (before the formation of the child clusters) to identify as "ugly" items that are not suitable for travel within a compartment. For example, such items may be fragile, too large, awkwardly shaped, too heavy or require some other special handling. Records for these items may be marked as ugly, which indicates that the item (the "ugly") is to be allocated to the parent agent for delivery and thus not allocated to a child cluster.

A further filtering technique may be used once child clusters have been created. In this filtering step, child clusters are filtered to remove records for items that are further from the hub position than a maximum delivery agent distance.

Additionally, the method may include accepting a user request for allocation of one or more items for delivery by the parent agent. For example, the user may request that an item is delivered by a van if the delivery location has security procedures that prohibit a delivery agent from entering the premises on foot. As another example, the user may request parent agent delivery if the item to be delivered requires installation (a domestic application, for example) and only the van driver is qualified to perform the installation.

Hence over one, two or several steps, the initial allocation to child and parent clusters is improved, allowing the best fit of the delivery schedule and use of resources to the particular items and locations for that period of time (usually one day for non-perishable goods, or maybe measured in minutes for time-sensitive goods, such as food deliveries).

Child clustering can use any suitable algorithm that groups the parent cluster to divide the records for the items into clusters. A number "k" of child clusters is formed. Spatially speaking, each cluster includes the hub location and groups together closely packed locations in one locality, with different child clusters covering different localities.

The variable k may be simply determined according to the number of delivery agents available, so that there is one child cluster per delivery agent. In a more flexible method, k may be determined according to the number of items (or records for items) in the parent cluster, the number of delivery agents available, and the number of items (records) already allocated to the parent agent, wherein k is the number of delivery agents unless there are fewer items for the delivery agents to deliver than delivery agents. In this latter case, k may be set to be equal to the number of items for the delivery agents to deliver (one item per child cluster).

In one example, the child clustering uses a k-medoids technique, forming k child clusters of records with recipient locations having minimised average distances between the recipient locations in each cluster.

In another method of forming child clusters, an initial record is provided in each cluster by assigning the k records with the closest recipient locations in turn, one to each of the k child clusters and then the remaining items are assigned to the clusters.

Preferably, the remaining items are assigned one by one, by calculating for each child cluster a distance measure related to the recipient location of the remaining record, deriving which clusters are below a threshold distance and thus qualify to receive the item, and assigning the remaining record (item) to a qualifying cluster. The distance measure may be based on the total distance so far that the delivery agent must travel to deliver all the items (including the "new" remaining record) in the cluster or a distance (for example from the most recently added delivery location) to the recipient location for the remaining record). Equally, the threshold distance may be based on the total distance or on the distance to the recipient location for the remaining record.

Once the qualifying child clusters have been found (or if there is no restriction to qualifying clusters), the method may further include calculating a measure of spread of all the (qualifying) child clusters from a cluster weight for each child cluster; calculating for each qualifying child cluster the same measure of spread of all the clusters if the remaining record were added; and assigning the remaining record to the qualifying cluster which provides the smallest change in the measure of spread when the remaining record is added.

The cluster weight may be determined based on distance travelled within the child cluster and/or number of records (deliveries) in the child cluster.

Once the child clusters and any parent agent cluster have been formed, the software calculates an optimised delivery route for each of the child clusters and any parent agent clusters, preferably using a Travelling Salesman Problem, TSP, algorithm.

Any suitable methodology may be used to create the delivery route. For ease of implementation, the first point of each child cluster delivery route may be a hub or reload location, where the delivery agent receives items from the parent agent.

Scheduling

Once delivery routes are created for the one or more delivery agents/child clusters and a delivery route is created for the parent agent cluster(s) to the hub and potentially continuing to other locations (for example for parent agent delivery and to reload the delivery agents with new compartments), the software uses the routes to create a schedule with events and timings. Any suitable method may be used to create the schedule. In general, an overall schedule is separated into individual schedules for each agent, which are linked when the agents cooperate.

As a first step, the method may comprise setting estimated arrival times at stops for each parent agent and delivery agent path or route (these terms are used synonymously). These timings do not necessarily include any time allowances for the deliveries themselves, but help to generate the schedule, for example by only taking into account a measure of travel times (between stops) without considering time at stops. This simplification allows quick calculation of reload scheduling as explained further below.

In one scenario, the delivery agent receives a further load (reload of a new compartment) from the parent agent and then continues on the delivery path. The time estimation may include delivery stops and reload stops (any transfer stop where the parent agent delivers a new compartment to the delivery agent) for a delivery agent, but omit transfer stops for a parent agent, so that the parent agent transfer stops can be created in dependence upon the delivery agent stops. Conversely, the transfer stops may be included for the parent agent and omitted for the delivery agent for later inclusion.

In the former case, the stops in a delivery agent route include any delivery agent transfer stop in which a delivery agent receives reload of a new compartment from the parent agent, and the method further comprises subsequently adding a corresponding stop into the parent agent path for each reload of a new compartment. The stop may be a wait stop event, as explained in more detail hereinafter.

In order to find out when best to add such a stop into the parent agent's route, the method may calculate when the delivery agent is estimated to arrive at the transfer stop and when the parent agent is estimated to arrive at any delivery stops that it has been allocated or at the transfer stop. The method may then compare the timings of the potential parent agent stops and the delivery agent transfer stops to add the location stop into the parent agent schedule at a suitable position (as a transfer stop or wait stop).

More specifically, the method may consider the stops on the parent agent delivery route in order of delivery, and find the time of the next stop, the time when the parent agent would arrive at the transfer stop if the route were changed to go directly to the transfer location and the time that the delivery agent is estimated to arrive at the transfer stop. The potential parent agent arrival times are compared with the delivery agent transfer time. The parent agent arrival time which is closest to the delivery agent transfer timing is selected. If this is the time when the parent agent would arrive at the transfer stop if the route were changed to go directly to the transfer location then the transfer location is added to the parent agent path at that position and the remaining path is re-calculated.

Otherwise (if the parent agent arrival time which is closer to the delivery agent transfer time is simply the next stop in the route), the method leaves the route and next stop unchanged and continues with assessing the route from that stop (again calculating which of the subsequent stop and potential arrival at the transfer stop is closer to the delivery agent transfer time).

This advantageous procedure allows creation of a parent agent route which includes a reload location at a suitable position in the route (in terms of distances from other delivery positions on the parent agent path and in terms of the delivery agent reload timing requirement) and avoids parent agent waiting time.

If there is more than one reload location (for example one for each delivery agent), the method can consider all the reload locations at the same time for inclusion in the van (parent agent) route and remove the reload locations from consideration as they are added to the van route.

Additionally, there may be the functionality to send a notification to the parent agent informing them of the probable timing of an impending upcoming arrival of a delivery agent for a reload event in real time (while the deliveries are in progress). For example, a notification may be sent to a van driver to inform them when a scheduled walking delivery agent's arrival at a reload location is a predetermined time, such as 15 minutes away. The timing of this notification may be based on a summation of scheduled events prior to the reload and/or on the current real-time progress of the delivery agent.

The reason for the notification is as follows. Sometimes a parent agent (van driver) might not follow the exact route generated for them. This can result in some confusion and longer wait times for the couriers (delivery agent) and they might ring and ask for a bag swap (new compartment) once they had completed their current compartment, and have to wait up to 30 minutes for the driver to work their way back to them to do the bag swap. In order to mitigate this situation, the system may send a notification (such as a GUI pop-up) to the driver to warn them when a porter is 15 mins away from the bag swap. The 15 minutes or other timing may be based on the summation of the events from the current position and prior to the swap, so it could be, for example, one 15 minute walk (go-to), or 1 delivery (2 minutes) plus walk to new location (3 mins), plus delivery (2 mins) and then a 7 min walk to the transfer location.

Returning to the schedule set up, the schedule can include pick-up events as well as delivery events. A pick-up event may be for the collection of an item which is to be delivered at a later stop on the delivery agent's route. In this case, the same item will appear in the generated schedule as requiring (first) pick-up and (then) delivery.

Alternatively, a pick-up event may involve the return of an item to a supplier (the return of an unwanted item of clothing, for example). In this case, the item will be returned via the delivery agent to the parent agent for return to the distribution warehouse. In both of these examples the method may consider the space available in the delivery agent's compartment at the time of item collection during schedule generation. For example, pick-ups may be scheduled after a threshold number of drop-offs (for example after all the drop-offs or after all the drop-offs with no pick-up for the same item). If the first event in the delivery agent's schedule is a pick-up, the software ensures that there is space available in that agent's compartment to enable the pick-up during the scheduling.

After the time estimation and adjustment of the van path for delivery agent reloading, a full schedule is calculated. The schedule is created using events. The events include travel events (in which the parent agent or delivery agent is travelling to the next location and stop events (these may include delivery, pick up, transfer between agents and wait). The stop events may be created for each agent (all the parent and delivery agents) from delivery route information and added to the travel events, which are already available from the routes.

Durations may be generated for each of the events. In general, the duration for a particular type of event may be set, or calculated. A travel event duration may be calculated using a mapping algorithm. A stop event may be given a set duration.

In more sophisticated implementations, use of information in the record or of historical information may allow a more accurate time estimate for stop events and/or go-to (travel) events, or even a more accurate calculation of the route and/or recipient location. For example, the software may parse the addresses and use the recipient location to set or adjust a standard delivery or pick-up of an item. In one instances, he inclusion of the term "Flat" or "apartment" or other equivalent term in an address may be used to flag a longer delivery time, because a flat will usually be within a larger building and thus more difficult to access than a house. An indication of a higher floor may additionally or alternatively be used to increase delivery time.

Historical delivery information may also be used to set or adjust a time estimate for a stop event. In this context, an adjustment algorithm may consult a stop classification database to identify one or more instances of time taken for deliveries to the same address and use the time taken (or an average time or longest time if there is more than one instance) in scheduling.

Such a stop classification database may additionally or alternatively store the actual location where a delivery agent has registered a delivery (for example using GPS data uploaded from a mobile device at the moment the delivery is registered). This actual location may be applied to the same address for future navigation instructions and/or delivery routes. Here, the benefit is that the actual delivery may be at a particular position such as a certain entrance or lobby which is not necessarily identifiable from the address.

Duration of a wait event may be calculated by comparing the time of arrival of the agents (usually 2 agents) involved in a transfer and adding a wait to the agent that arrives first from the time of arrival to the time of arrival of the agent arriving second. For ease of implementation, a wait event may be added for each agent before or after each event which involves another agent, and the value may be set at zero, pending calculation of which agent needs to wait and for how long. In one embodiment, a transfer event is added for one of the agents (for example the agent receiving the item) and a corresponding wait event of at least the same length is added for the other agent, to end when the transfer ends. This does not yet cover the possibility that the agent with the transfer event needs to wait, and thus a wait event is also added for the agent with the transfer event.

An iterative procedure may be used to determine the length of the wait events, with timings for agent schedules being calculated in turn, with the aim of completing each agent schedule (as far as possible), and then passing to the next agent schedule. The events in two separate schedules are linked (as related events) for a transfer between two agents. When the timing for a first agent schedule is calculated, it may not be possible to determine the length of a wait, if the schedule of the other agent with the related event is not yet completed up as far as the transfer. In that case the process continues with one or more further agent schedules in turn (until each is complete or "stuck" at another wait) and eventually circles around to the first agent. At that stage, the schedule for the other agent may be complete as far as the transfer. If after a predetermined number of tries to complete all the schedules, the schedules are not complete, an error may be produced.

The wait events may be updated in real time (while the agents are in action), to take into account actual timings that deviate from a schedule such as delays or agents which are running fast and adjust the schedule of an agent who is not running to time and/or of an agent whose actions are dependent on another agent which is not running to time. For example, consider the case where a van driving delivery agent is scheduled to wait 10 minutes at a particular location for the arrival of another delivery agent: if the van driving delivery agent is caught in traffic and is therefore delayed 5 minutes, the wait event may be updated to indicate that the van driving delivery agent now will only need to wait 5 minutes.

If delivery agents can travel within the parent agent, the scheduling part of the method may include calculation of a current vehicle for each user. Also, of course, the parent agent needs to be present to provide a transfer. Hence, for each agent and each stop action, the method may calculate which vehicle is the current vehicle required for the stop action and associate (link) the agent with the current vehicle, so that the schedule cannot separate the two for the duration of the stop event.

Once the timings have been calculated for the events for each user, including all the delivery and pick-up events for the child agents and parent agents, this constitutes a completed overall schedule for the parent cluster (which is divided into one individual schedule per agent)

In a more sophisticated embodiment, the timing in the schedules may be updated in real time to reflect progress of the agents (but without changing the order of delivery). For example, if a delivery agent is late, then not only is the delivery agent schedule updated, but the parent agent schedule is updated if the parent agent is required to meet the delivery agent later (for example to transfer a new compartment to the delivery agent or to receive items picked up by the delivery agent).

Many variations may be made to the logistics method. As mentioned above, in one example, the hub position is a safe (perhaps lockable or attended) place where the parent agent can leave the compartment. In this way, the parent agent and delivery agent need not meet, and some scheduling constraints are removed.

In another example, a child cluster includes two or more items at the same address (or at equivalent addresses, which refer to the same place but are formatted differently). To cater for this, the system may accept one signature for more than one delivery. There are two situations where this can happen:

a. When the address is identical, the software will confirm this is a multi drop and all parcels will be included in the same delivery event. In this way, a single signature may be used for all of the items.

b. The addresses are slightly mismatched i.e. the building name used in one and only the street address used in another. In this case the software will not identify these as the same delivery event, so there will be two events to complete.

In order to help in scenario b—the software may allow the user to re-use a signature. Once a single signature has been taken, a timer will start. If any deliveries are made inside the time window (which is set as a default to 2 mins but can be updated, for example based on user preference) then the courier is offered the chance to copy across the signature for the other parcels/deliveries. The logic here is that the reception staff at large buildings prefer not to sign for 10 separate parcels, but rather just give their signature once for all of them. This saves time for both the receptionist, and also the courier when making a multi drop delivery.

Hence the method may further comprising accepting notification of delivery from the delivery agent and a confirmatory signature from a recipient, wherein if a further notification of delivery is entered within a predetermined time from the notification, then the delivery agent is presented within an option to copy the signature to the further notification.

The following practical embodiment is of a simple implementation for delivery using delivery vans with drivers (parent agents) operating out of a depot in an industrial estate location and delivering to an inner-city location, where walkers with trolleys or trolley bikes and bikers (delivery agents) are used for high-density deliveries. One child cluster is allocated per walker/biker at a time. For simplicity, a single van and thus a single parent cluster only is considered, as well as a single distributor. Delivery takes place daily in this example, but the same methodology applies for time-critical delivery.

The van has a shuttle run between the depot and the hub, or multiple hubs. Hence it may return with a further cluster for a walker. It may also deliver uglies and outliers and other items that have been filtered from the walker clusters.

A digital manifest from the distributor arrives at the depot for the items to be delivered on a certain day. Each line of the digital manifest is a record for one item (or parcel). The line may be referred to as a line item. The digital manifest is loaded into the software (referred to generally as MoDe:Link) which is a cloud-based set of algorithms for routing, scheduling, customer communications, data analytics and optimisation.

The digital manifest may be matched against the items that arrive for delivery on the given day, so that records for items which have not arrived can be deleted. This may take place by way of an initial scan of barcodes on the items received. Records for items which could not be delivered in the previous delivery can be added, perhaps also by way of scanning.

The initial scan may use a portable device such as a smartphone and an application from the MoDe:Link software suite. The application (or app) may give a green banner for parcels which are on the manifest and a red banner and haptic or audio feedback for a parcel not on the manifest. At this stage, uglies may be manually designated using the app, so that they are allocated to the van driver for delivery and/or automatically designated using the physical information and/or comments in the manifest.

As a next step, the schedule is generated, as explained in more detail elsewhere. The method determines which cluster is assigned to which user. The assignment may be random, follow a strict system or allow manual assignment, or take into account the abilities/location etc. of the users. For example, some users may be qualified as delivery agents but not as parent agents. The schedule, or relevant individual parts thereof, is transferred to applications running on mobile devices of the van driver and walkers.

The schedule may be generated using either a standard or a corridor method. In the standard method the delivery van drops off parcels at a single central location. Couriers/walkers meet the van and set off on their deliveries from this location. In the corridor method, the delivery van drops loaded bags at a safe place, such as a storage locker for the couriers to pick up. This removes the need to meet the van and gives extra flexibility in scheduling but is more complex to organise because it requires centrally located urban storage lockers or manned premises.

In the next step, each parcel is rescanned, and the app indicates a bag (compartment) letter corresponding to an individual bag (A-Z) and a number (1 to be packed first and delivered last, 2 to be packed second etc. or vice versa). Currently the number and letter are manually written or printed on the parcel. However, in an automated method the re-scanning and manual labelling steps may be omitted. The parcels are loaded in order into the bags. It is worth mentioning here that more than one bag might be assigned to a single walker. For example, the van may return to re-load more bags for a second trip or it may drive on to a further hub location when it can pick up an empty bag and give a replacement bag to a walker.

The uglies are numbered, but not allocated to a child cluster or given a letter—they are allocated to the van driver for delivery. The same is true of any outliers. These van deliveries can occupy the van and driver while the walkers are delivering, before a second bag is given to a courier.

FIG. 1a is a schematic diagram of a logistics apparatus 10 in the form of a computing apparatus or device, for a user to assist delivery of items to recipients situated at different recipient locations. The logistics apparatus comprises memory 20 and a processor 30 to execute a graphical user interface GUI 40. The GUI is displayed on a display 50 and linked to user input means 60. The display 50 and user input means may be formed together as a touchscreen, or separately, for example as a terminal screen and mouse or other pointer and keyboard.

The logistics apparatus has access to an overall schedule of deliveries, with individual schedules 70 for agents acting as parent and delivery agents. One or more individual schedules or the overall schedule may be stored in memory 20, or they may be accessed via a network interface (for a fixed terminal) or via a transceiver.

Each item is represented as a record, and each parent agent 80 has a parent cluster of records allocated to it for a first transport stage along a route to a hub position. The records in each parent cluster are further clustered according to recipient location into one or more child clusters for a second transport stage, each child cluster being allocated to a delivery agent 90 which operates along a route from the hub position of the parent agent and delivers at recipient locations.

The overall schedule includes an individual schedule 70 for each agent with events and locations and timings for the events, wherein the events include travel events in which the agent is travelling along a route and stop events in which the agent is carrying out any of the following stop actions: delivering items, transferring items between agents and waiting. For example, a simple parent agent (van) schedule may include a travel event to drive along its route to the hub, a stop event to transfer compartments to a delivery agent (walker) and a further travel event to drive to its own delivery along a continuation of the route. A corresponding simple delivery agent (walker) schedule may include a stop event to transfer a compartment from the parent agent, and then a succession of alternating travel events to delivery locations and stop events to deliver the items in the compartment.

The GUI controls the display to display an individual schedule stored in memory or accessed in the form of a schedule view in which a time sequence of events is displayed, including an indication of scheduled event timing; and a map view in the form of a map overlaid with stop event locations and travel event routes. Of course if the GUI shows information from other schedules, other parts of the overall schedule or indeed all the overall schedule may need to be stored locally or accessed.

When there is a user selection via the user input means of an event in the schedule view and/or when there is a user selection via the user input means of an event in the map view, the GUI controls the display means to display an event view including details of the event.

Figure 1B:
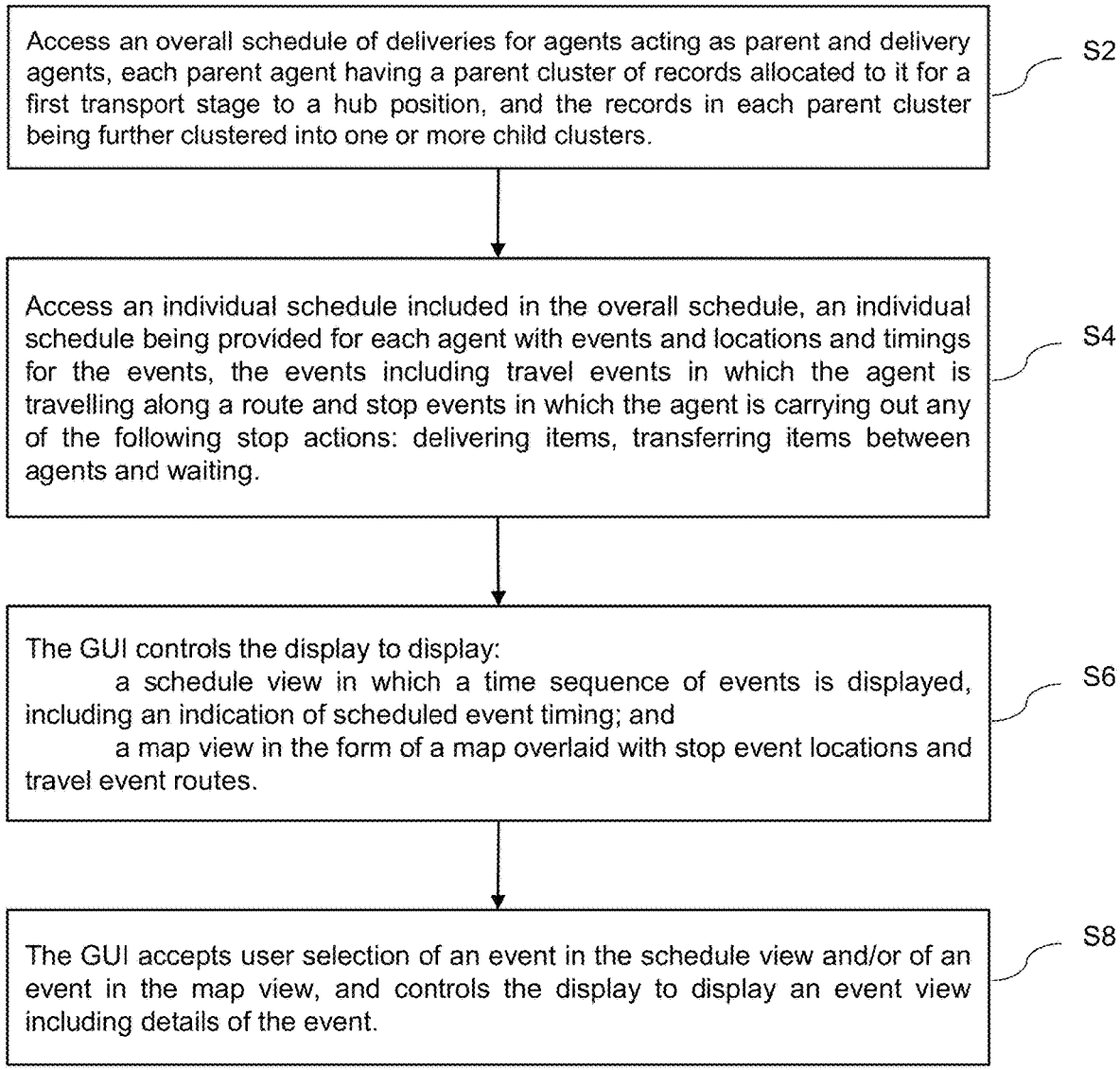
FIG. 1b is a flowchart of a computer-implemented logistics method to arrange delivery of items to recipients situated at different recipient locations in a general example.

FIG. 1b is an equivalent flowchart according to a general embodiment of a computer-implemented method of assisting delivery of items to recipients situated at different recipient locations using the logistics apparatus described above. In this method, firstly in step S2, an overall schedule of deliveries is accessed. This schedule is for agents acting as parent and delivery agents, with each item for delivery represented as a record. Each parent agent has a parent cluster of records allocated to it for a first transport stage along a route to a hub position. The records in each parent cluster are further clustered according to recipient location into one or more child clusters for a second transport stage. Each child cluster is allocated to a delivery agent which operates along a route from the hub position of the parent agent and delivers at recipient locations.

In a second step, S4, an individual schedule included in the overall schedule is stored in memory (or otherwise accessible). This individual schedule is provided for each agent with events and locations and timings for the events. The events include travel events in which the agent is travelling along a route and stop events in which the agent is carrying out any of the following stop actions: delivering items, transferring items between agents and waiting.

In the next step, S6, the GUI controls the display to display a schedule view in which a time sequence of events is displayed, including an indication of scheduled event timing; and a map view in the form of a map overlaid with stop event locations and travel event routes. The schedule view and map view may be provided concurrently (on the display screen at the same time) or one after the other.

Finally, in S8, the user input means/GUI accepts user selection of an event in the schedule view and/or user selection of an event in the map view, and the GUI controls the display means to display an event view including details of the event. Physical delivery follows.

Figure 2:
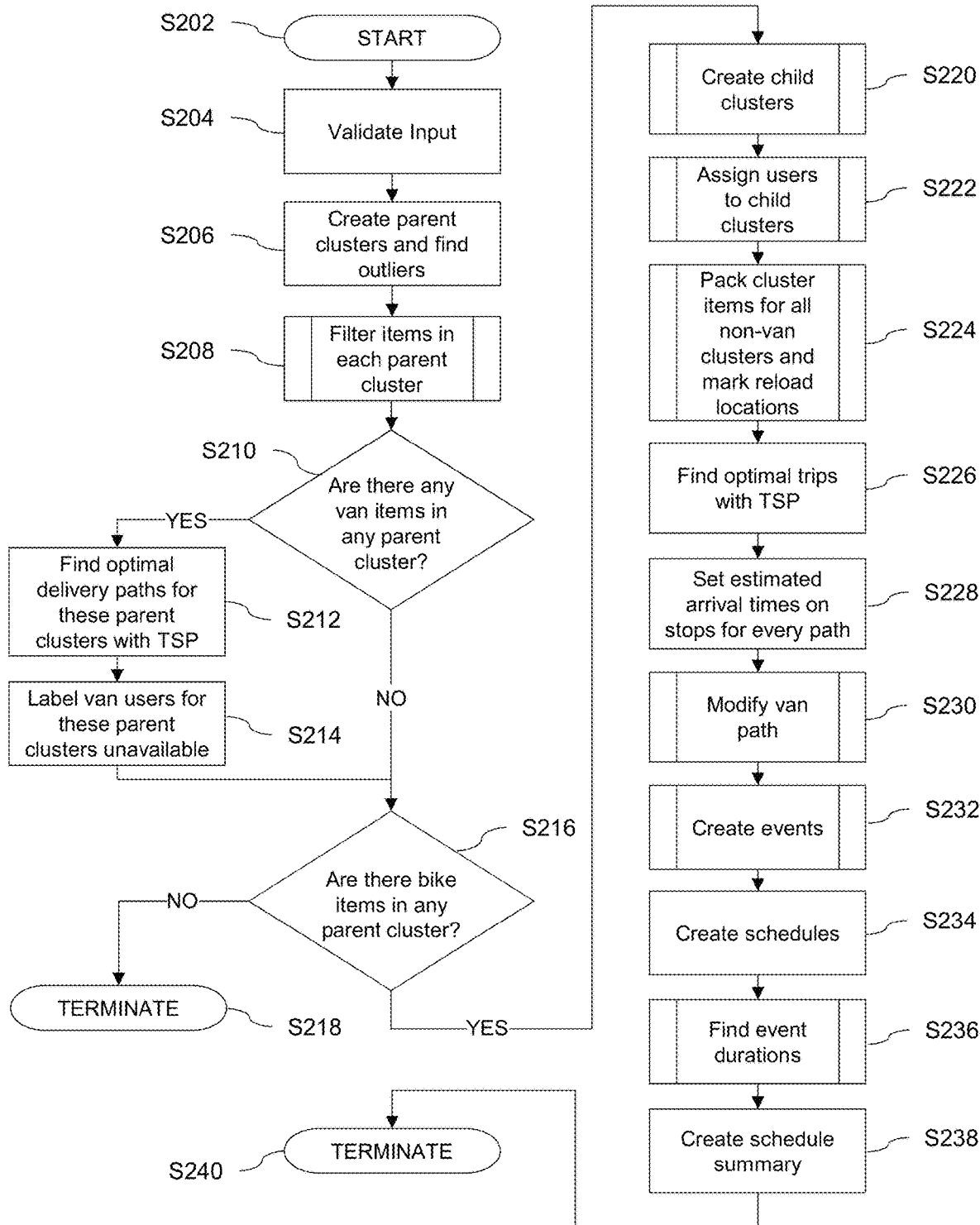
FIG. 2 is a high-level overview flowchart of a schedule generation method according to one example.

FIG. 2 is a flowchart of schedule generation according to a particular embodiment.

Step S204 validates the input datasets. The input datasets are the digital item manifest, the list of available vehicles, the list of available users (the people involved in the physical delivery via the van and local delivery), the user-vehicle assignments, the warehouse address, and the schedule description (name of schedule). These datasets may be pre-stored in or imported into the system and thus this step may not require manual input. Additionally, a central user may input variables (options) to set the preferences for schedule generation. For example, the user may specify at this stage that they require a van to be used to deliver some of the items.

Additionally, for example, the user may specify that they wish to optimise the delivery for a particular set of assets that that have available on a particular day—for instance, a user may manually input the available vehicles and users and the MoDe:Link system will run through the scenarios to find the combination which would create the cheapest or the shortest delivery schedule.

In the 'generate schedule' tab of a GUI there may be an option to have strict assignment which is auto selected (as a default) and in which each person is assigned to a particular role/vehicle. If this option is removed, then a depot manager can list the total number of assets that they have available on a particular day, say 1 van, 3 bikes, 10 walking bags, along with 8 people, and MoDe:Link may run through the scenarios to find the combination which would create the cheapest or the shortest delivery schedule.

Step S206 forms parent clusters, for example using DBSCAN as previously described. This clustering procedure results in a number of clustered sets of items (parent clusters) and potentially outliers, which are determined to be so distant from the other items in the parent clusters that they are to be handled separately via the parent agent (i.e. not put into a child cluster, but delivered by the van).

Step S208 filters the items in each parent cluster. The filtering marks each item to be delivered as a van item, a bike item, or an undeliverable item. Incidentally, here and elsewhere, the terms "bike" and "bike item" denote a child agent and an item to be delivered by a delivery agent, respectively, and are not limited solely to bicycles or items to be contained in a bicycle compartment. The delivery agent may be a walker with a trolley or scooter, or a mixture of walkers and bikers may be used or any other local delivery agent.

Step S210 determines if there are any items designated as van items (those to be delivered by the van) in any parent cluster. If not, the process continues with step S216. If there are van items in any parent cluster, a TSP algorithm finds the optimal delivery paths of the van in each of the relevant parent clusters (S212) before the user who is designated as driving the van is marked as unavailable (S214) (because they will be occupied delivering the van items). In this way, the van driver is not considered as a delivery agent capable of delivering items via bike or on foot.

Step S216 determines if there are bike items in any parent cluster (that is, an item to be delivered via bike). If there are not, this suggests that only van drivers are required to perform deliveries and the method terminates (S218).

If there are bike items in any parent cluster, child clusters within each parent cluster are created (S220). The logic here first determines the number (k) of child clusters to be created. In a simple embodiment, the number of child clusters is equal to the number of couriers (for example the number of bike couriers, plus the number of walk and bike couriers) or equal to the number of bike and walk couriers if there are no deliveries allocated to a van.

Using the predetermined value of k, child clusters of items are created. The child clusters may, for example, be created using a k-medoids algorithm, which divides a set of data points (delivery locations) into k subsets (child clusters) so that the subsets minimize the sum of distances between a data point and a centre of the data point's child cluster. In k-medoids the centre of the data point's child cluster corresponds to a data point in the cluster (as opposed to a k-means algorithm where the centre point may not correspond to an accessible location). Alternatively, a balanced child clustering algorithm may be used, as explained later.

Step S222 allocates each child cluster to an individual user who is to be responsible for delivering all items within the child cluster. The allocation may take account of the capacity of the individual user, especially if there is a large variety in capacity (for example some bike users with larger bike trailers and some walkers with smaller walking trolleys.

Step S224 "packs" the child clusters, i.e. allocates them to compartments. For example, one child cluster may require two compartments and thus two trips for a delivery agent, with a reload location between the two trips. The necessary reload locations (if any) for each bike user are determined. See FIG. 6 for a description of this procedure according to one embodiment.

Step S226 uses a TSP algorithm to find the optimal trips to be taken by the delivery agents for each child cluster. One trip corresponds to one compartment, so a delivery agent may have one or more trips (within a single child cluster allocated to that delivery agent). The arrival times at each stop on each trip is estimated, potentially using a simple time estimation based on mapping software (S228). Step S226 may take place before S224, particularly if the packing of the cluster items depends on the order of delivery.

Step S230 modifies the van path to account for the need for the van to meet a delivery agent during a reload event. That is, in the event that all items corresponding to a single child cluster do not fit into one delivery agent's bundle of items (one compartment), the delivery agent must meet with the parent agent to reload/replace their bundle with one stored in the van. See FIGS. 7a and 7b for a description of this procedure according to one embodiment. In another way of handling reloads, it may be that there are predetermined safe locations in the local area where the parent agent may leave bundles of items; the delivery agents' routes may then incorporate stops at such locations at appropriate times.

Step S232 creates events. This event creation procedure takes the vehicles that each user is operating at each stage of the logistics procedure into consideration, and generates events for all users. See FIG. 8 for a description of this procedure according to one embodiment.

Step S234 creates the complete schedule. This schedule contains details of all events that all users are to perform during the delivery of items. Step S236 calculates the anticipated duration of each of these scheduled events. See FIGS. 10a, 10b and 10c for a description of this procedure according to one embodiment. Step S238 produces a summary of the schedule for display.

Figure 3:
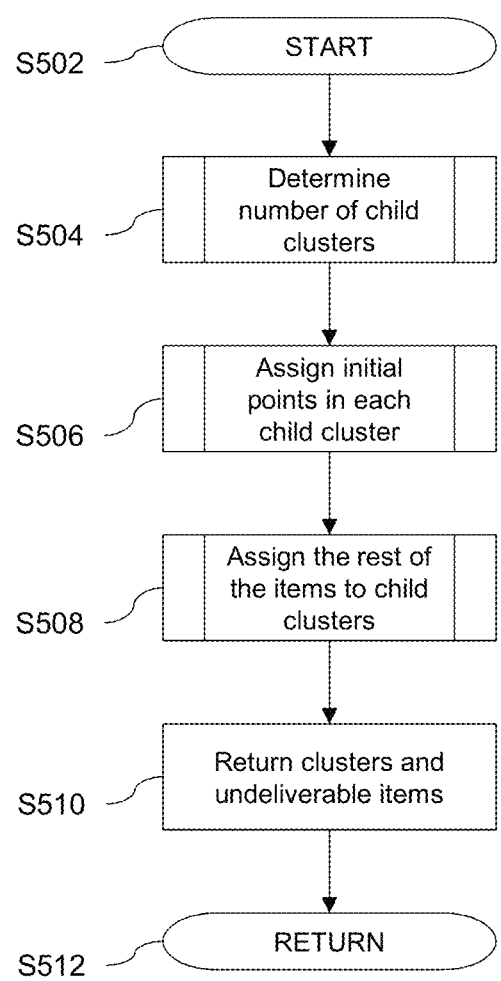
FIG. 3 is a high-level overview flowchart of the assignment of items to child clusters according to one balanced child clustering example.

FIG. 3 is a flowchart outlining a high-level overview of the creation of child clusters using balanced child clustering. Balanced child clustering evens out the distribution of items between delivery agents, whereas k-medoids may allocate unevenly (i.e. one delivery agent may have a far higher number of deliveries to process relative to another delivery agent). Initially, step S504 determines the number of required child clusters, which can be thought of as an optional refinement of the value of k previously determined to handle situations in which there are very few items for delivery. Step S506 then assigns initial points (item delivery locations) for each child cluster; an example of one embodiment of this process may be seen in FIG. 4. Step S508 then assigns all other items to the child clusters. Further details of one embodiment of this process may be seen in FIG. 5. The resultant child clusters and details of any items that are deemed to be undeliverable via this logistics method are then returned (S510) and the child-clustering process terminates (S512).

Figure 4:
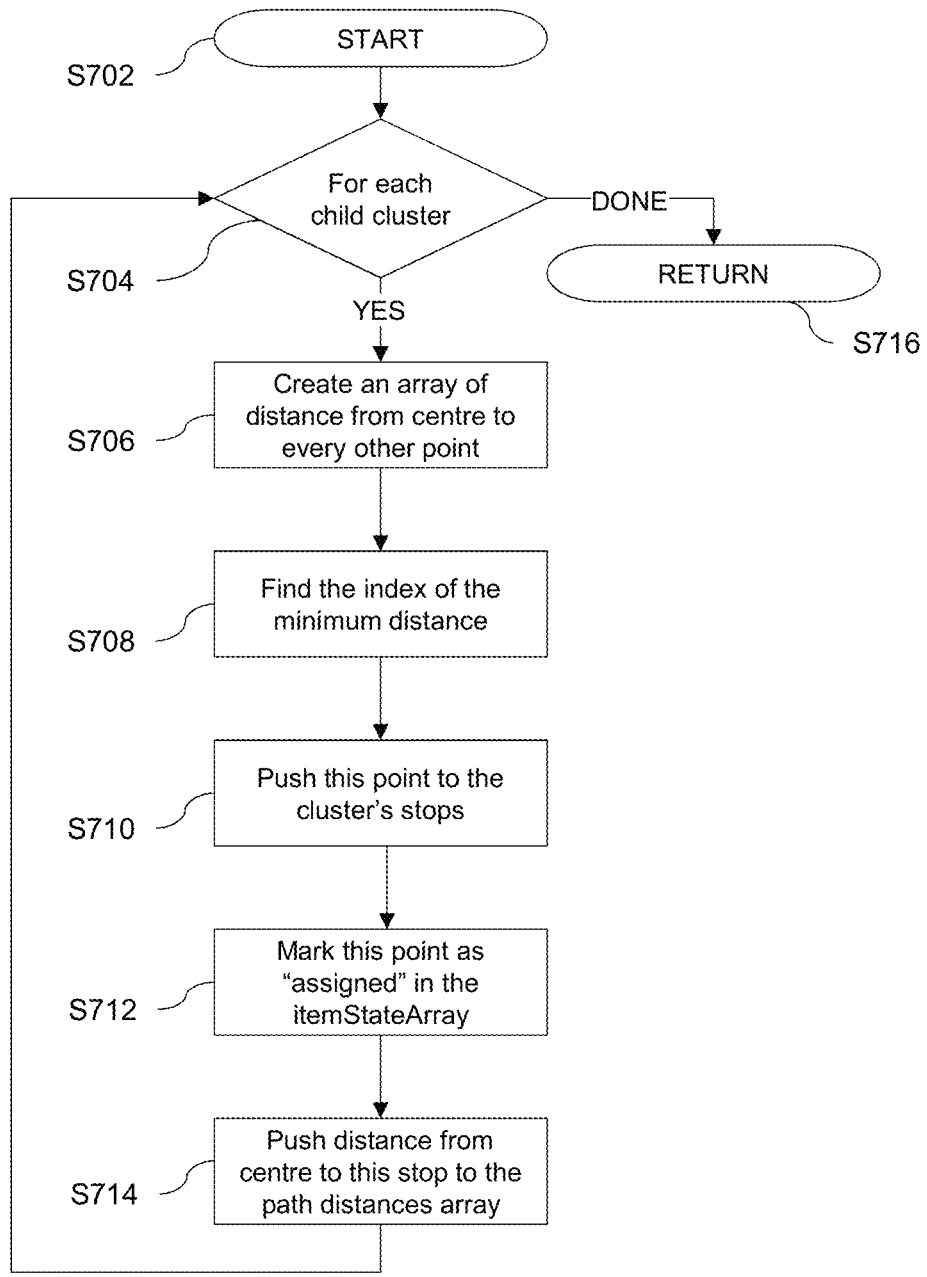
FIG. 4 is a flowchart describing the assignment of initial items for each child cluster according to one example.

FIG. 4 is a flowchart detailing the assignment of initial items in each child cluster. The assignment process begins by considering each child cluster (S704). At this point there is a number k of items in the cluster, but specific items have not yet been assigned. Step S706 creates an array containing the distances from all item delivery locations in the child clusters to the centre point of the parent/DBSCAN cluster. This centre point is the medoid of the set of items in the parent cluster, that is, it is the location where the sum of the distances to all of the other items is lowest.

Step S708 finds the index of the array containing the location that is the closest to the centre of the parent cluster. Step S710 pushes this delivery location to a first cluster's list of stops, which are later used to create events. Step S712 then marks this "pushed" delivery location as "assigned" in an array defining the state of the item, indicating that the item has been considered, accounted for, and will be delivered. Step S714 then pushes the distance from the parent cluster centre to this stop to an array containing the distances that the delivery agent responsible for this particular child cluster will travel. Steps S706 to S714 are then repeated for further child clusters. When initial points for all k child clusters have been assigned (S704, done), the process terminates (S716).

In effect, steps S706 to S712 sort the list of items/ locations by their distance from the parent cluster centre, putting items closest to the centre first. Then, for each cluster in turn, the next closest item in the list of sorted items is assigned to the child cluster. Before marking the item as "assigned", the item state (as stored in the item state array) may be null, indicating that the item is not yet assigned and—so far—it is thought that the item will be deliverable. Alternatively, the item may be of the state "undeliverable", indicating that no one is able to deliver this item.

Figure 5:
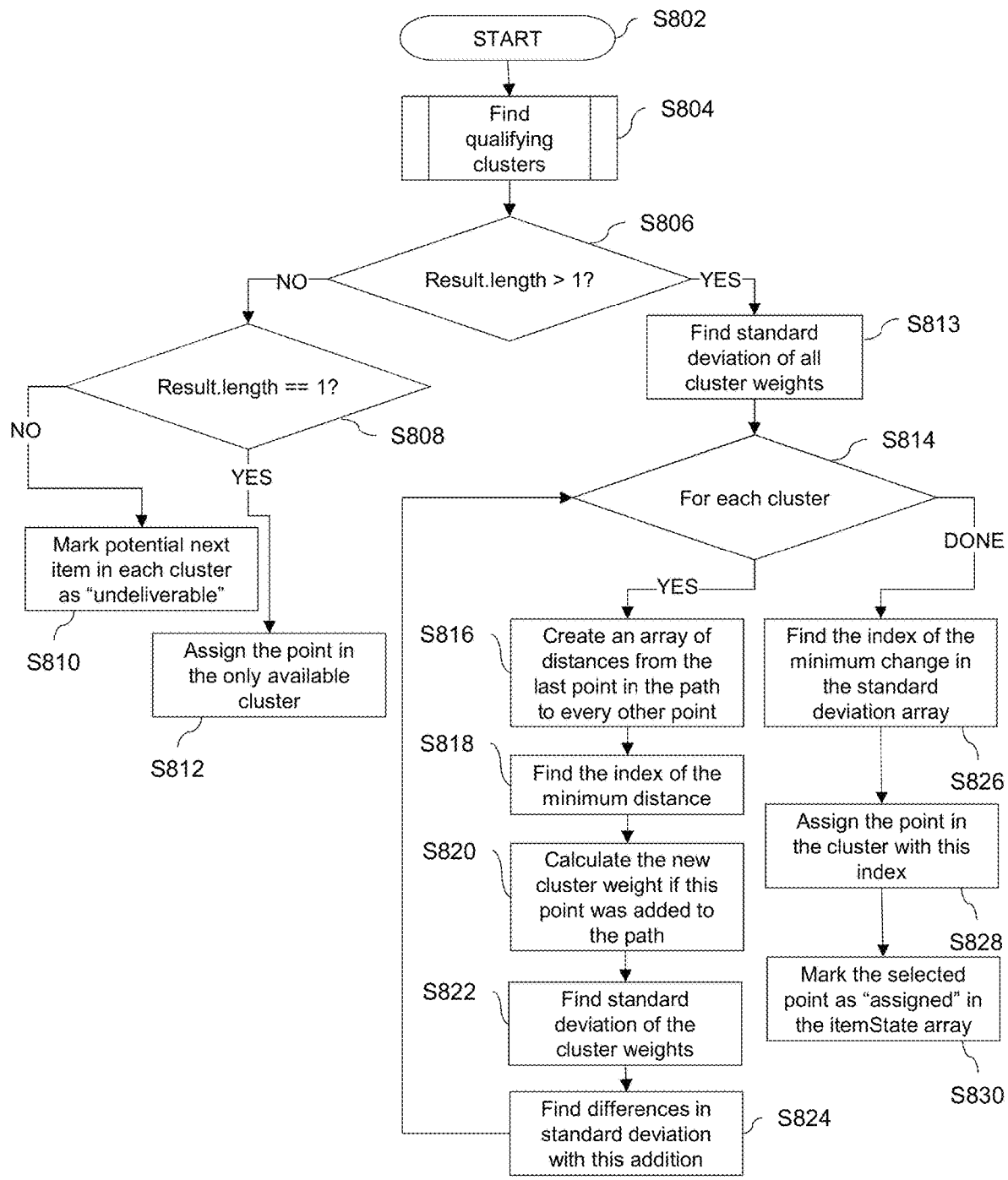
FIG. 5 is a flowchart describing the assignment of all remaining items to child clusters according to one example.

FIG. 5 is a flowchart outlining the assignment of all remaining items (following the assignment of the initial items) to the child clusters. Optional step S804 finds qualifying clusters, that is, clusters that may successfully include the item under consideration without causing the distance travelled by the delivery agent to be too great. The determination of qualifying child clusters (child cluster to which an item may be assigned) may consider all child clusters one-by-one, and determine the cumulative path distance, D, including the distance from the closest existing point (delivery location) within the child cluster to the item to be assigned. Comparison with a maximum distance for the current child cluster mode, Md, marks the child cluster as a qualifying cluster within a qualifying cluster array if D<Md. If the answer D≥Md the cluster is not included in this array.

Step S806 considers the number of qualifying clusters for each item. In the event that there is not more than a single eligible (qualifying) cluster for a particular item (S806, no), step S808 asks if there is just one qualifying cluster for that item. If the answer is no (S808, no), then there is no child cluster to which an item may be assigned and step S810 marks the item as "undeliverable" in each child cluster. If the answer is yes (S808, yes), then step S812 assigns the item to the only qualifying cluster.

In the event that an item may be assigned to a plurality of child clusters (that is, there are multiple qualifying clusters) (S806, yes), step S813 calculates the standard deviation of all of the qualifying cluster weights (each weight is based, for example, on the total time and/or distance of the delivery agent's path in each qualifying child cluster). Step S814 then starts the logic to consider a single qualifying child cluster if there are still child clusters to be processed (S814, yes). Step S816 creates an array containing the distances from the last point in the delivery path to every other point. Step S818 finds the index of the array containing the minimum distance. Step S820 calculates the weight of the cluster (total distance of the delivery path) with the addition of the delivery location of the item and step S822 finds the standard deviation of the cluster weights with this new addition. Step S824 calculates the difference between this new standard deviation of the cluster weights (with the addition of the item) and the old standard deviation (before the addition of the item). When steps S818 to S824 have been performed for all qualifying child clusters (S814, done), step S826 determines the qualifying child cluster that—with the addition of the item—results in the smallest change in cluster weights standard deviation. Step S828 then assigns the item to this child cluster and step S830 marks the item as "assigned" in the previously described item state array.

In effect, steps S816 to S830 calculate the standard deviation of the qualifying child cluster weights with and without the new item and add it to the cluster that causes the minimum change in standard deviation. This is directed at keeping the clusters around the same duration. This logic is repeated for each item.

Figure 6:
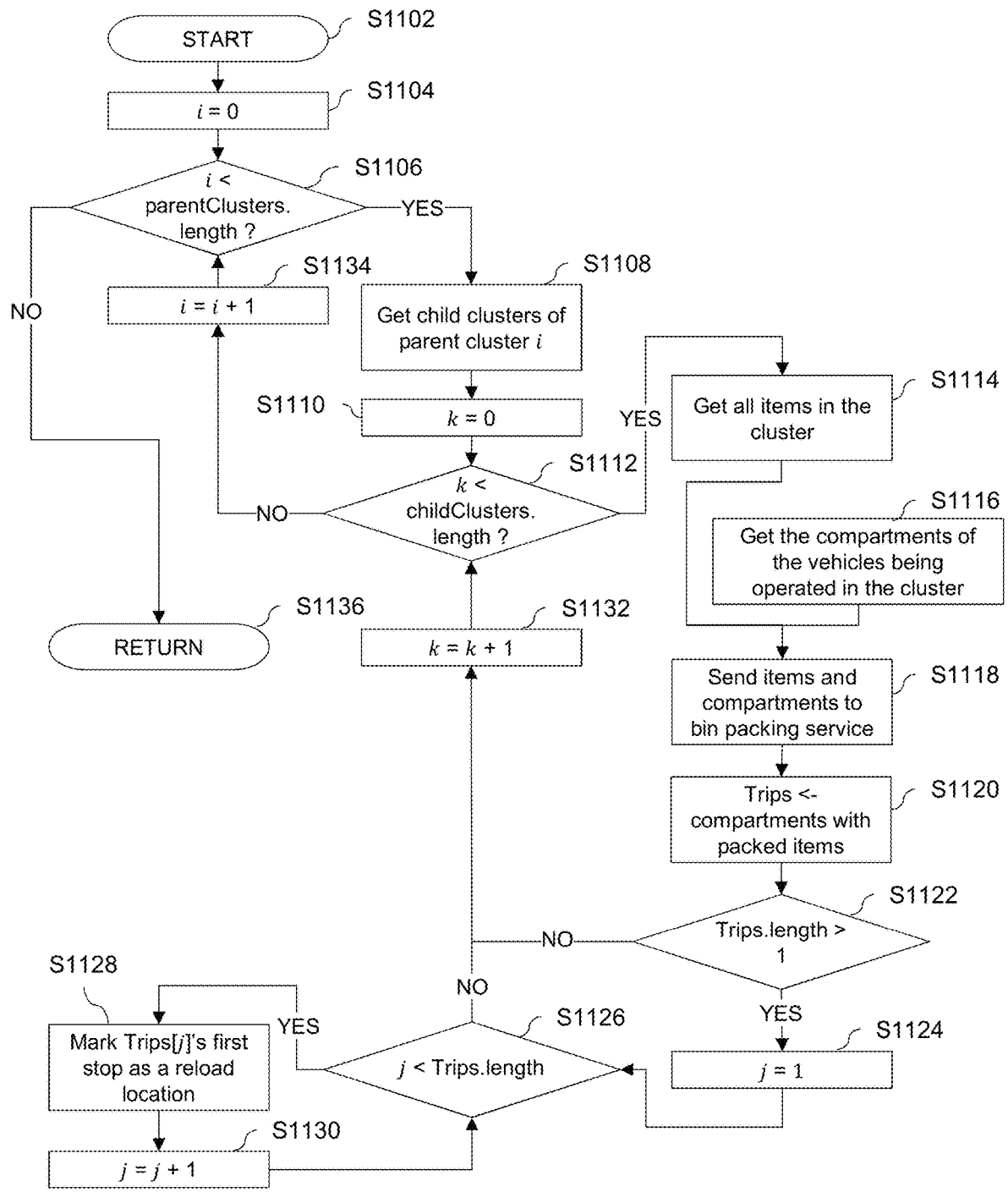
FIG. 6 is a flowchart describing the allocation of items into compartments and the determination of necessary reload locations between trips according to one example.

FIG. 6 is a flowchart illustrating the packing of items into compartments and the determination of necessary reload locations between trips. Step S1104 initialises a counter variable (i) that will loop through all parent clusters. Step S1106 questions if the current counter value (i) is less than the total number of parent clusters. If the answer is yes (indicating that there are still parent clusters to consider) (S1106, yes), step S1108 obtains all child clusters from the current parent cluster and step S1110 initialises a new counter variable (k) that will loop through all child clusters of the current parent cluster.

Step S1112 questions if the current child cluster counter value (k) is less than the total number of child clusters within the parent cluster. If the answer is yes (indicating that there are still child clusters to consider) (S1112, yes), step S1114 loads the records of all items in the current child cluster. Additionally, optional step S1116 loads the details of the compartments of the operational vehicle of the child cluster. Step S1118 then sends details of the items and the compartment sizes to a bin-packing algorithm to determine a method of packing the items in the available container (for example by order of delivery or by size, for example if the compartment sizes are provided/different).

Step S1120 assigns the packed compartments (following the bin-packing algorithm) to the parameter "Trips". Step S1122 questions if the length of "Trips" is greater than 1. If the answer is yes, this indicates that a child cluster must comprise multiple smaller subdivisions (trips) that will require the delivery agent to reload at an intermediate location in the child cluster route. Step S1124 initialises a new counter variable (j) that will loop through all the trips of the current child cluster. Step S1126 questions if the current trip counter value (j) is less than the total number of trips within the child cluster. If the answer is yes (indicating that there are still trips to consider) (S1126, yes), step S1128 marks the first stop of the trip currently under consideration as a reload location, meaning that the van has to meet the biker/walker at this location in order to reload the compartments with items to be delivered. The trip counter (j) is then increased by a value of 1 (S1130) and the determination of reload proceeds from step S1126.

When all necessary reload locations are marked (S1126, no) or in the event that no reload locations for a child cluster are required (as all items may be delivered in one trip) (S1122, no), step S1132 increases the child cluster counter (k) by a value of 1 and the bin packing procedure from step S1112 proceeds for the next child cluster. When the current value of k matches the number of child clusters, indicating that all child clusters have been handled (S1112, no), step S1134 increases the parent cluster counter (i) by a value of 1 and the acquisition of child clusters (followed by the bin-packing of these clusters) proceeds from step S1106. When the current value of i matches the number of parent clusters, indicating that all child clusters within all parent clusters have been handled (S1106, no), step S1136 terminates the child cluster bin-packing and trip reload marking procedure.

In effect, the logic presented in FIG. 6 loops through all of the child clusters of all of the parent clusters and passes the child cluster's items through a bin packing algorithm (potentially along with details of the compartment's size). The bin packing returns details of trips that need to be performed in order to deliver all items within the child cluster. The first item of each trip is then marked as a reload location, indicating that the van must meet the delivery agent at this position in order to reload the delivery agent with more items for delivery. In this way, or by using another scheduling method, the delivery agent's stops, including reload locations, are put in an order along a path. This may take place before inserting these reload locations into the van schedule, for example as explained below.

Figure 7A:
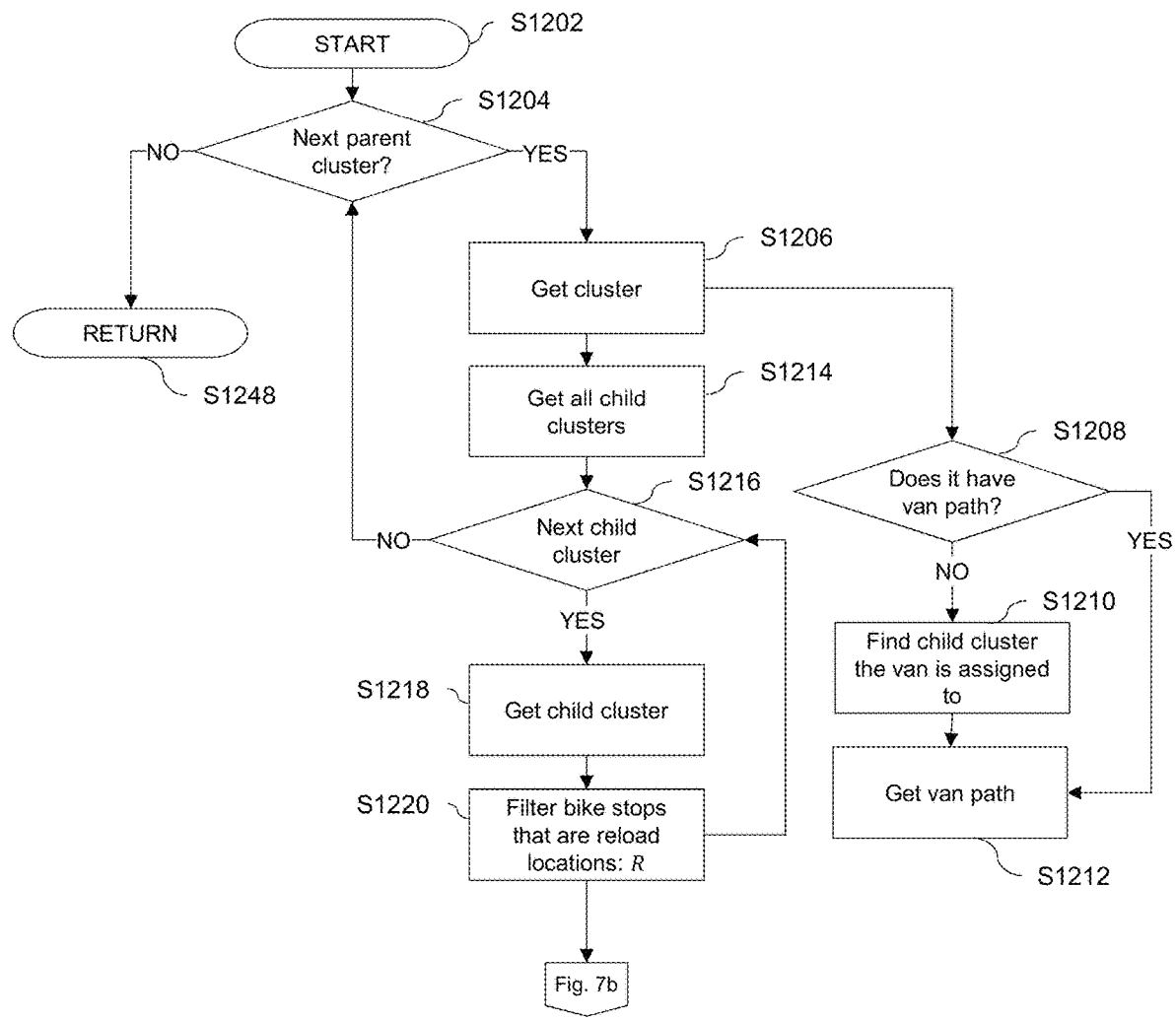
FIG. 7 (comprising FIG. 7a and FIG. 7b) is a flowchart describing the adjusting of a parent agent schedule for the reloading of other delivery agents according to one example.
Figure 7B:
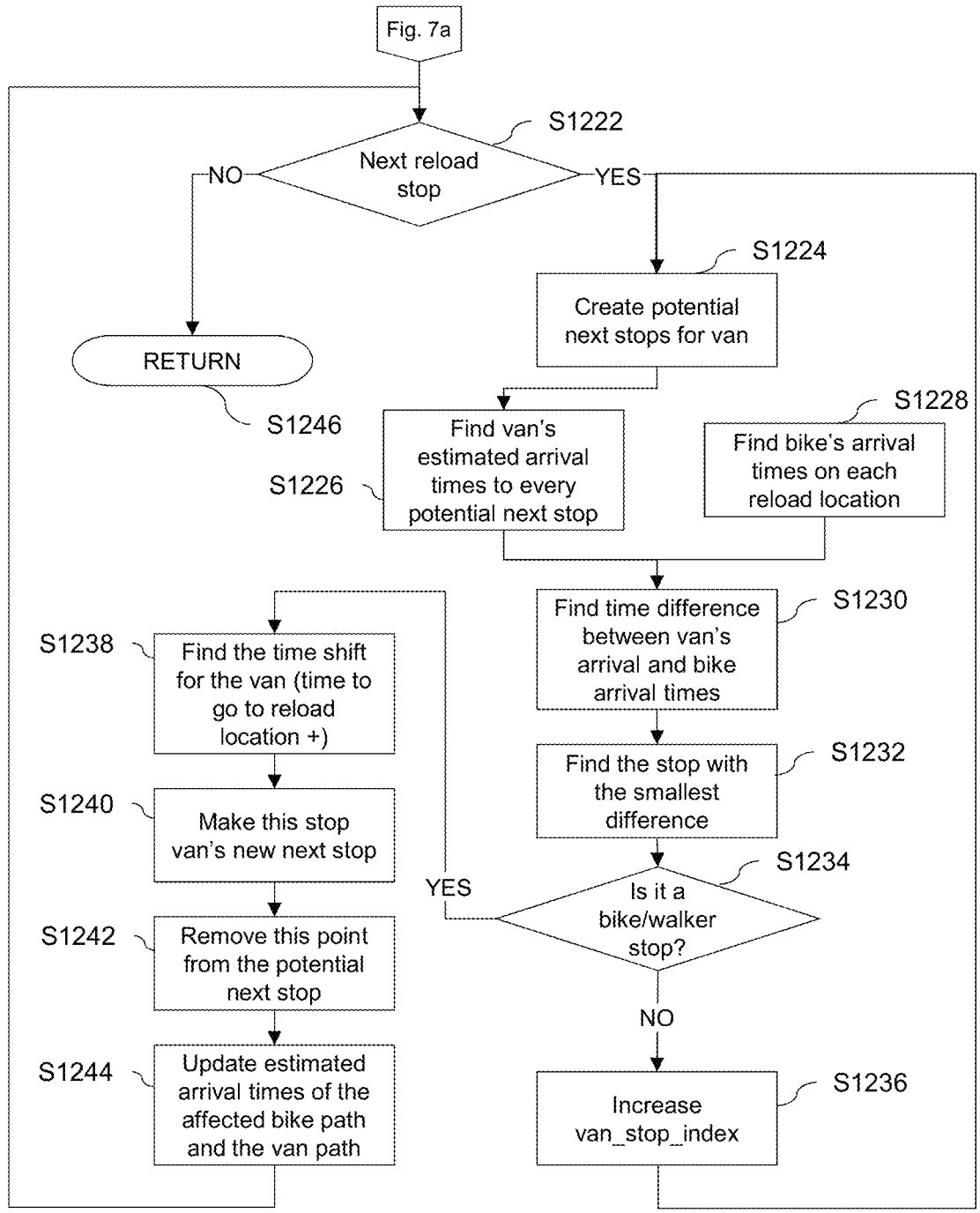

FIG. 7 (divided into FIGS. 7a and 7b) is a flowchart describing one embodiment of adjusting the van (parent agent) scheduling for reloading of bikes (or other delivery agents). The bike scheduling/reloading works by comparing the estimated arrival time of the van at its next stop with the estimated potential arrival time of the van at each of the bikes' reload locations and the arrival time of the bikes at the reload location. On the basis of this comparison, the process may insert this location into the van's schedule before the van performs its own stop.

Step S1204 questions if there are any more parent clusters left to handle. If yes, step S1206 loads the parent cluster. Step S1208 then asks if the parent cluster has a van path associated to it. If the answer is no (S1208, no), step S1210 finds the child cluster to which the van is assigned and step S1212 loads the van path associated with this child cluster. Alternatively, in the event that the van does already have a path to follow (S1208, yes), step S1210 loads this van path.

Step S1214 loads details of all child clusters within the parent cluster. Step S1216 questions if there are any child clusters left to consider. If the answer is no (indicating that all reload locations have been handled within the current child cluster) (S1216, no), the next parent cluster is considered (S1204, yes). Alternatively, if the answer is yes (S1216, yes), then step S1218 loads the records of the current child cluster. Step S1220 determines all bike stops within the child cluster that are reload locations (R). This process is repeated for all child clusters.

FIG. 7a effectively considers the van path (if there is one) and all of the bike reload locations.

In FIG. 7b, step S1222 questions if there are any further reload locations to consider. If yes, step S1224 creates potential next stops for the van, which are where the van is already planning to go, plus the next biker/walker reload locations. Step S1226 finds the van's estimated arrival time at each of the potential next stops and step S1228 finds the bike's (or any other delivery agent's) estimated arrival time at each reload location. Step S1230 finds the difference between the two estimated arrival times for each potential next stop and S1232 determines the stop corresponding to the smallest arrival time difference. Step S1234 then questions if this is a bike/walker stop.

In this example, a small or negative time difference is desirable in order to avoid the van wasting any time by remaining stationary for extended periods of time (awaiting the arrival of the empty bikes). In the event that the stop with the smallest time difference is a bike/walker reload stop (S1234, yes), step S1238 finds the additional time required for the van in its own schedule to include the reload location as the next stop. Step S1240 assigns this reload stop as the van's next stop (in the van's route). Step S1242 removes this reload stop from the list of potential next stops in order to ensure that the reload location is not chosen again. Step S1244 updates the arrival time of the bike for the affected bike path (in the event that the chosen reload location requires the previous bike path to deviate) and/or updates the arrival time of the van for the affected van path (in the event that the chosen reload location requires the previous van path to deviate).

If step S1234 determines that the stop with the smallest time difference is not a bike/walker stop (S1234, no), step S1236 increases the van stop index by a value of 1 (i.e. bringing the next van stop into consideration). The process continues from step S1224 as outlined above, only now considering a new potential van next stop. When a suitable reload location is identified (suitable in the sense that, for example, it is closer in time to the bike reload time than the next stop on the van's list), the next bike reload stop is processed (S1222). When all reload stops have been assigned a reload location, the reload scheduling (for this particular parent cluster) process terminates (S1246). When all child clusters from all parent clusters have been handled (S1204, no), the overall reload scheduling process terminates (S1248).

Figure 8:
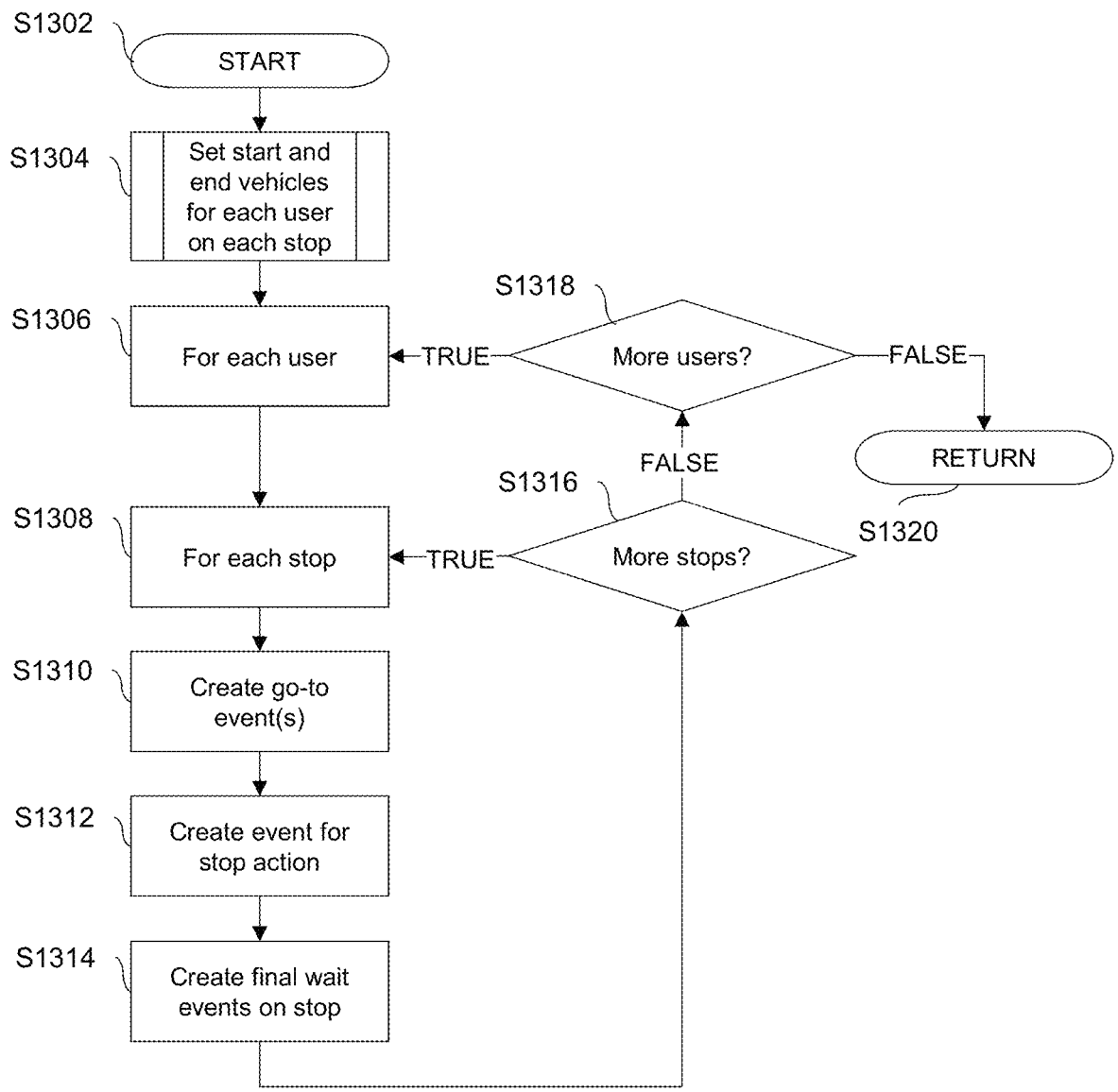
FIG. 8 is a flowchart describing the creation of events for users according to one example.

FIG. 8 is a flowchart describing a process in which events are created. Events here correspond to activities performed by the users of the logistics method and include, for example, "wait", "go-to", "transfer", and "deliver". In effect, the logic of FIG. 8 is directed at first putting all actions when there is no movement into a series of "stops" and "stop actions". These stops and stop actions are then converted into events.

Step S1304 sets the start and end vehicles for each user at each stop. Further details of this step according to one embodiment may be seen in FIG. 9. Step S1306 initially loads details of a single user including their path. Step S1308 then obtains details of the first stop assigned to the user on their delivery route or their van route. Step S1310 creates a "go-to" events, which is an event that require the user to move from one location to the stop event (for example, a biker may be required to move from one delivery location along their assigned route to another). Step S1312 then creates an event for the stop action (for example, it may be necessary for a biker to get dropped off by a van or it may be necessary for a van driver to hand over (transfer) a full compartment of items to a walker). Step S1314 creates a final wait event on the stop if necessary. In this way, the actual amount of time spent in the wait (which can be initialised at zero) may be calculated later.

Step S1316 questions if there are more stops associated to the user to be considered. If there are (S1316, true), step S1308 loads the next stop and steps S1310 to S1314 are repeated. If there are no more stops for this particular user (S1316, false), step S1318 questions if there are any more users to consider. If there are, step S1306 loads the next user and all of this user's stops are considered as previously described (step S1308 to S1316). When events have been created for all users (S1318, false), the process terminates (S1320).

Figure 9:
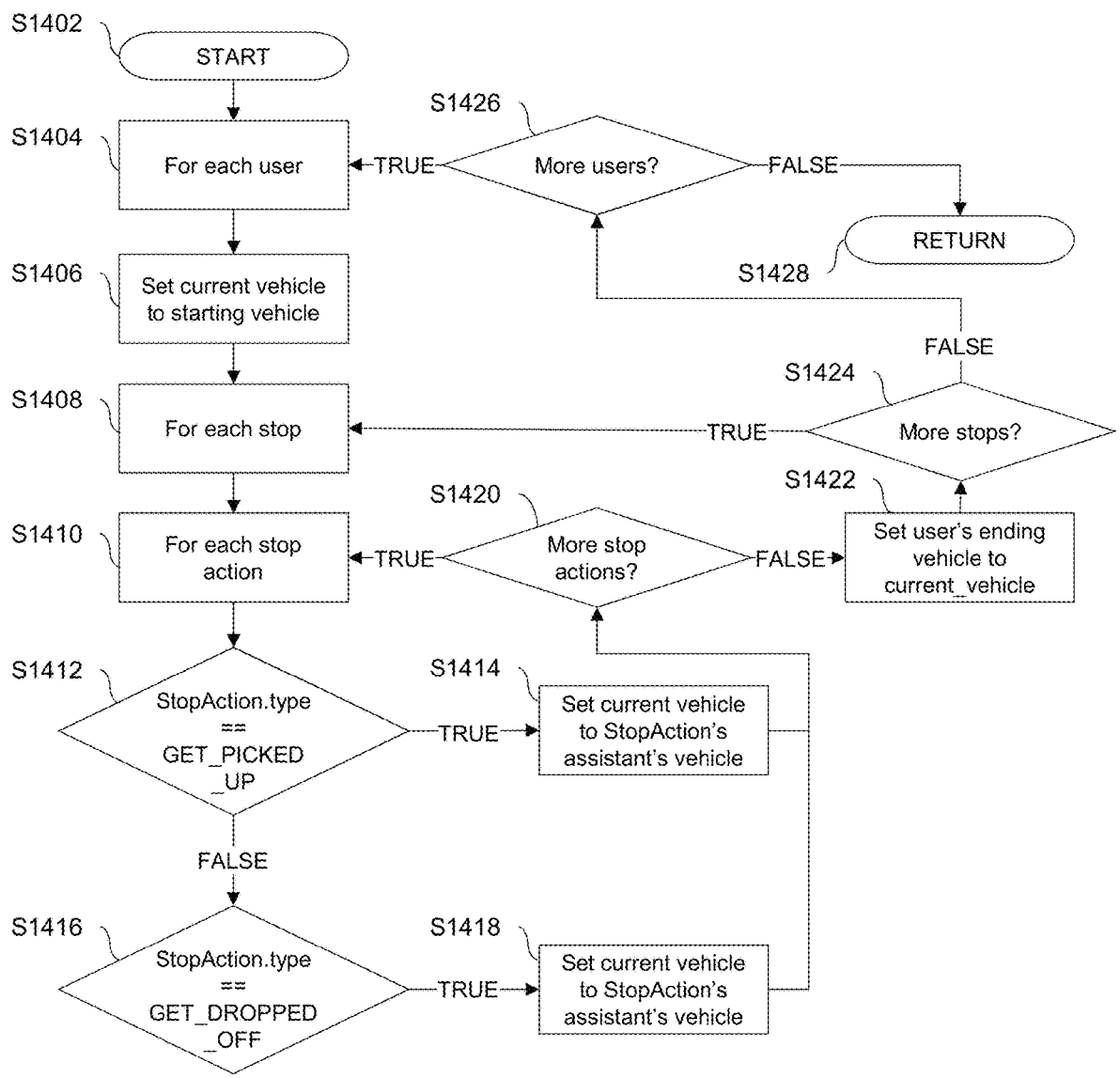
FIG. 9 is a flowchart describing the setting of the start and end vehicles for each user on each stop according to one example.

FIG. 9 is a flowchart describing a process whereby the start and end vehicles are set for each user on each stop (in S1304). This process is used to determine when people need to wait. For example, if a delivery agent is on a bike at the beginning of a stop and will end up in a van, the delivery agent will need to wait for a van to arrive and later wait for a van to complete all of its events before going to the next stop.

Step S1404 considers the next user. Step S1406 then sets the current vehicle for this user (represented by the variable "current_vehicle" in the flowchart) as their starting vehicle. Step S1408 then loads details of that user's next stop and step S1410 loads details of the action associated with that stop. Step 1412 questions if the type of stop action indicates that the user is to be picked up. If the answer is yes (S1412, true), step S1414 then sets "current_vehicle" to match the vehicle in operation by the assistant. For example, the current vehicle of a bike operator, after being picked up by a van, will be changed to a van. Alternatively, if the answer is no (S1412, false), step S1416 questions if the type of stop action indicates that the user is being dropped off. If the answer is yes (S1416, true), step S1418 then sets the current vehicle in use by the user to the assistant's vehicle. For example, if a bike operator is being transported to the start of their child cluster via a van, the current vehicle of a bike operator, after being dropped off by the van, will be changed to a bike.

Following steps S1414 and S1418, step S1420 questions if there are more stop actions for the user to consider. If the answer is yes (S1420, true), the next stop action is loaded by step S1410 and steps S1412 to S1418 are repeated. If the answer is no (S1420, false), this suggests that the vehicle currently indicated by the "current_vehicle" variable is the final vehicle that the user will be operating at the end (step S1422).

Step S1424 questions if there are more stops for the user to consider. If the answer is yes, the next stop is loaded by step S1408 and the above described setting of the final vehicle for the user for the stop (steps S1410 to S1422) is repeated. If the answer is no, the next user is loaded by step S1426 and the above described setting of the starting and the final vehicle for the user for all stops (steps S1406 to S1424) is repeated. When all users have been considered (S1426, false), step S1428 terminates the setting of start and end vehicles.

Figure 10A:
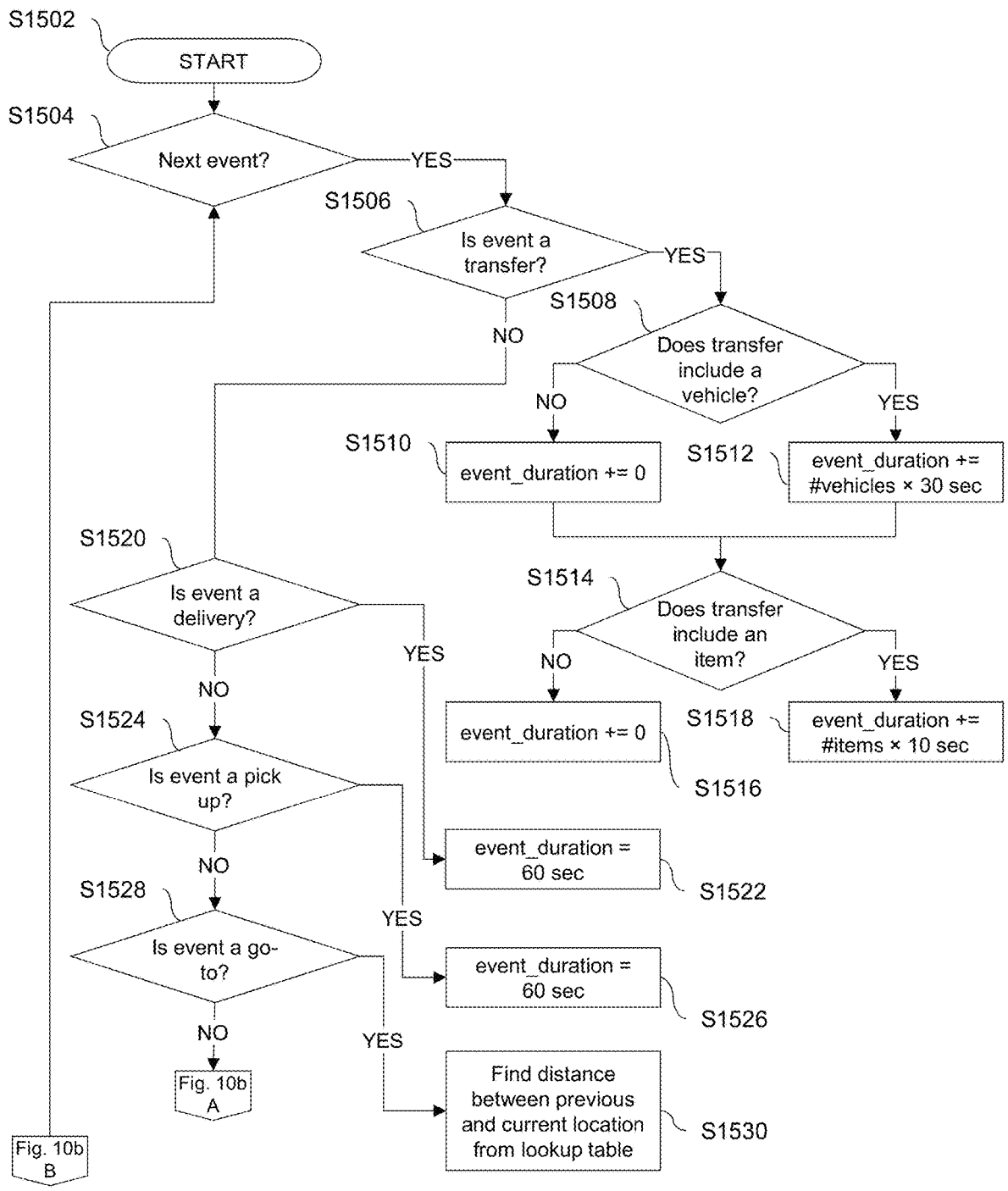
FIG. 10 (comprising FIG. 10a and FIG. 10b and FIG. 10c) are flowcharts describing the calculation of the anticipated duration of all events in a schedule according to one example.
Figure 10B:
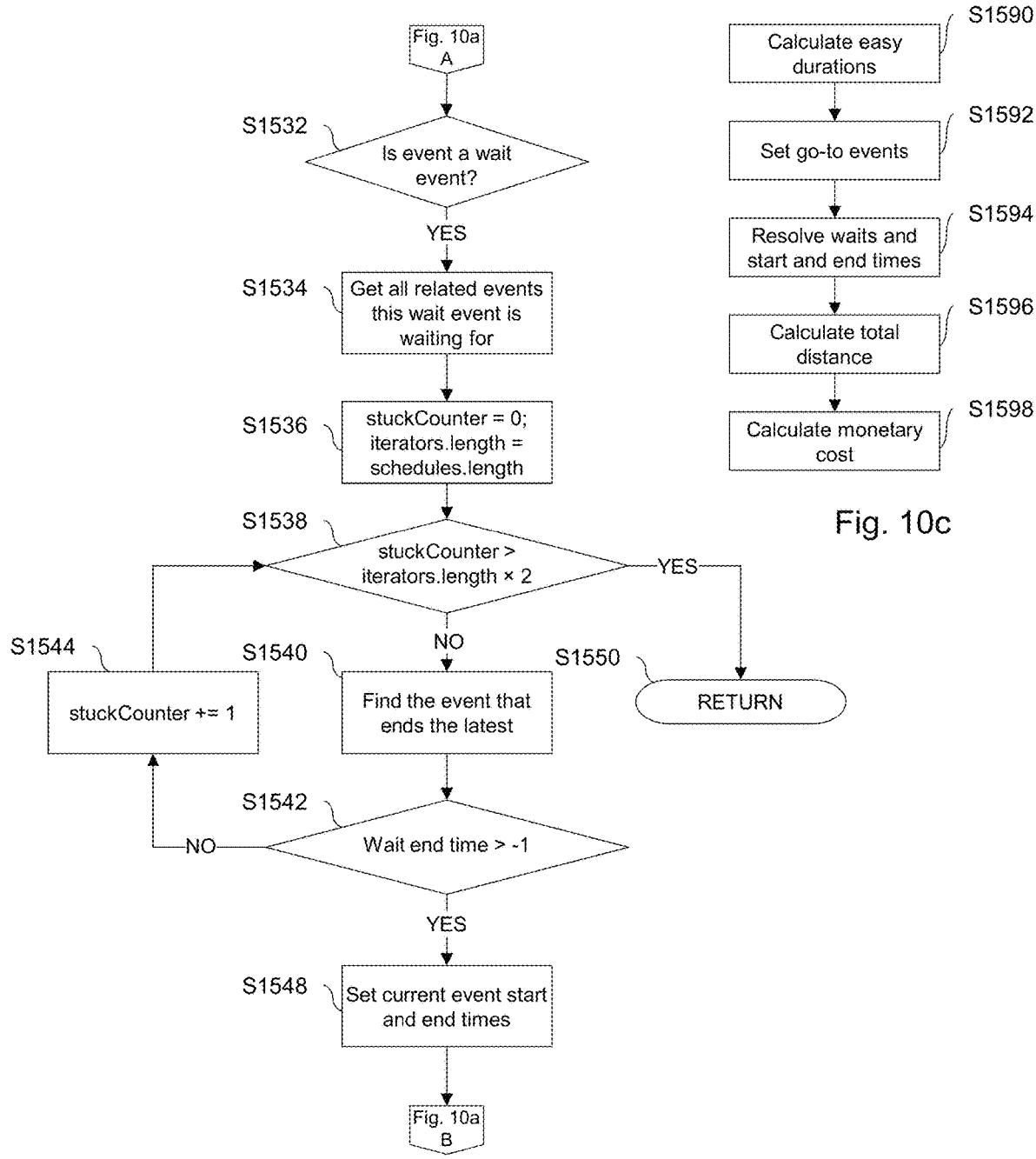

FIGS. 10a and 10b are flowcharts detailing a method of allocating durations to all events in the schedule (for all users). Step S1504 questions if there are any events yet to consider. If the answer is yes, step S1506 questions if the event under consideration is a transfer event. If the answer is yes, step S1508 asks if the transfer includes a vehicle (for example, a van driver may be transferring a foldable bike to a delivery agent). If the answer is no (S1508, no), step S1510 does not change the value of the event duration (taken here to be initialised at a value of 0). If the answer is yes (S1510, yes), step S1512 increases the value of the event duration variable by a value of 30 seconds for each vehicle (for example, the transfer of 2 bikes will be allocated 60 seconds).

Following both S1510 and S1512, step S1514 asks if the transfer includes any items. If the answer is no (for example, the transfer may be solely of a bike), step S1516 does not change the value of the event duration. If the answer is yes, step S1518 increases the value of the event duration variable by a value of 10 seconds for each item (for example, step S1518 would allocate 100 seconds for a user to perform the initial packing of 10 items into a compartment, or if the item is a compartment, then 10 seconds would be allowed for the transfer of the compartment). The anticipated transfer duration is then the resultant value following steps S1508 to S1518.

In cases where the event is not a transfer (S1506, no), step S1520 asks if the event is a delivery. If the answer is yes, step S1522 sets the anticipated delivery duration to 60 seconds. Alternatively, it may be that this value is calculated or adjusted based on the complexity of the delivery process (for example, additional time may be allocated for a user to climb numerous flights of stairs).

In cases where the event is also not a delivery (S1520, no), step S1524 questions if the event is a "pick up" (when an item is picked up by a biker/walker or a compartment by a van). If the answer is yes, step S1526 sets the anticipated pick up duration to 60 seconds. This value may also be varied.

In cases where the event is also not a "pick up" (S1524, no), step S1528 asks if the event is a "go-to" event. If the answer is yes, step S1530 determines the distance between the two locations (that is, from where the user is departing and to where the user is going). In this embodiment, this information is stored in a lookup table. The distances—in combination with the anticipated or historically observed speed of the user—may be used to determine the anticipated "go-to" event duration.

In cases where the event is also not a "go-to" event (S1524, no), step S1532 in FIG. 10b questions if the event is a wait event. If the answer is yes (S1532, yes), step S1534 obtains all events related to the wait event (that is, related events that the wait event is waiting for).

In one embodiment, related events are determined in the following way:
All related events are always attached to "wait" events—i.e. they are what is being waited for
Related events are defined at the following steps
Event Creation Phase—
Pickup Events
The related event is simply the go-to (travel) event of the user picking them up.

Drop-Off Events (of Biker/Walker)
The related events are simply the transfer of items needed before they get off.
Drop-Off Items Events
The related events are for each user who is waiting to have items dropped off to them.
Get Reloaded Locations
The related events are those that the user has to wait on to get reloaded—the reloader's travel event to the reload location.
Reload Locations
Reload locations are determined in an earlier step. As part of van (parent agent) delivery event generation, each of these reload locations is checked. All the bikes that have to wait at this reload location are added to the van's reload event's related events.

Referring again to FIG. 10b, step S1536 initialises a counter variable ("stuckCounter") at 0 and sets the length of the iterator to equal schedules.length.

As a general overview, the stuck counter exceeds iterators.length whenever it cannot determine wait times of all events after two passes (i.e. the iterators.length*2 assignment). The duration calculation works by iterating through the event list of each schedule (one schedule per agent and one at a time). For every event that is related to a different schedule's wait event, the software might not have yet calculated that related event's duration, so cannot determine the duration of this wait event until this is done (since it depends on the time it takes to do all other events that it is "waiting" for). So the stuck counter is incremented and the logic moves to the next schedule to try and resolve all other schedules up to this same point. Once the duration service makes its way back around to this schedule that got "stuck", there should be sufficient information to determine the wait time. If not, something has gone wrong so an error is produced.

The iterators.length is determined by the number of schedules being passed on by the duration service. So for 3 bikes and 1 van, four iterators are generated. It is the structure that iterates through the event list of a schedule.

Returning to the flowchart, step S1538 performs the error detection procedure to check if the counter value is greater than double the length of the iterator/number of schedules. If so, there is an error (S1538, yes), and step S1550 terminates the event duration calculation process.

If there is currently no error (S1538, no), step S1540 considers the current wait event in a schedule that it is processing and any event from the list of related events obtained in S1534 and determines which of the two events ends the latest.

Step S1542 questions if the wait end time (the time at which the wait event is due to end or, equivalently, the time at which the related event is due to start) is greater than −1 (that is, either zero or any positive value); a negative value is used as a flag to indicate that the timing in the related schedule has not yet been calculated. In this case, the StuckCounter is incremented by 1 in S1544 and the process passes on to the next agent's schedule.

If the wait event is not associated to an error (S1542, yes), step S1548 proceeds to set the event's start and end times and step S1504 loads the next event for processing (commencing from S1506).

An alternative, high-level overview of the event duration calculation is provided in steps S1590 to S1598 of FIG. 10c. Step S1590 calculates "easy" durations, which may be seen as the durations of events that have a pre-set, standard value. Step S1592 then sets the "go-to" events, which involves the calculation of the anticipated duration by considering the distances between locations. Step S1594 resolves the "wait" events and associated start and end times. In effect, the operations of steps S1502 to S1548 may be seen as one embodiment of steps S1590 to S1594.

Additionally, optional step S1596 may calculate the total distances that each vehicle and/or user is due to travel within the entire schedule. Step S1598 then may calculate an estimate of the monetary cost of the delivery procedure; this calculation may make use of a cost per unit time value as described elsewhere.

Figure 11:
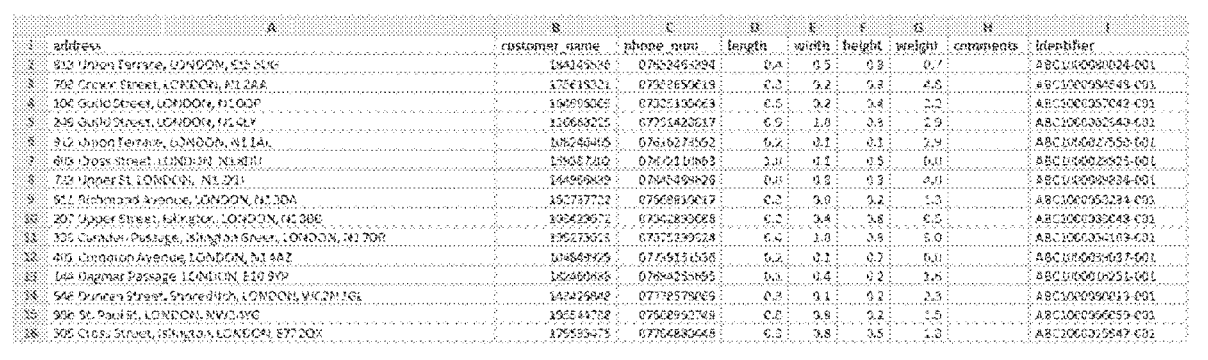

An exemplary digital manifest in shown in FIG. 11. The manifest arrives in comma-separated value (.csv) spreadsheet format from the distributor and includes item identification in the form of a barcode number ("identifier"), a recipient location ("customer_address"), a customer reference ("customer_name"), a phone number ("phone_num"), dimensions ("length", "width", "height"), and a weight. Comments may also be added. A status may be assigned for each item, such as "arrived" (at the depot), "packed" (into a compartment), "out for delivery", "delivered", or "undelivered" (after a delivery attempt). This can be displayed on the schedule and used downstream in information processing.

The digital manifest is processed in the MoDe:Link software to cluster the items as explained herein and to provide a schedule for their delivery using the bikers/walkers and the van driver.

The digital manifest is used as an input for the schedule generation alongside a list of vehicles, a list of users, details of user-vehicle assignments, warehouse address, any other relevant addresses other than warehouse and delivery addresses (for example, reload locations that are known to be suitable to facilitate reloads), and a schedule description (which may simply be in the form of a schedule name and date).

The list of vehicles contains details of the vehicles available to perform item delivery. This may include, for example: the current location of the vehicle; the maximum permitted distance of the vehicle (that is, the pre-set distance that the vehicle is permitted to travel in a single outing); the maximum permitted speed of the vehicle (for us in scheduling calculations as described elsewhere); the physical dimensions of the vehicle's compartments (compartments that items to be delivered are stored in during transport); the maximum total weight that the vehicle is permitted to carry; and the maximum number of individual items. Additionally, the list of vehicles may include an estimate for the operational cost of the vehicle per unit time, which may be used to estimate the total cost of the delivery procedure. This value may be determined, for example, by considering historical costs of deliveries.

The details of user-vehicle assignments may include, for example, mappings between available users and the vehicles that they are permitted to operate.

Figure 12:
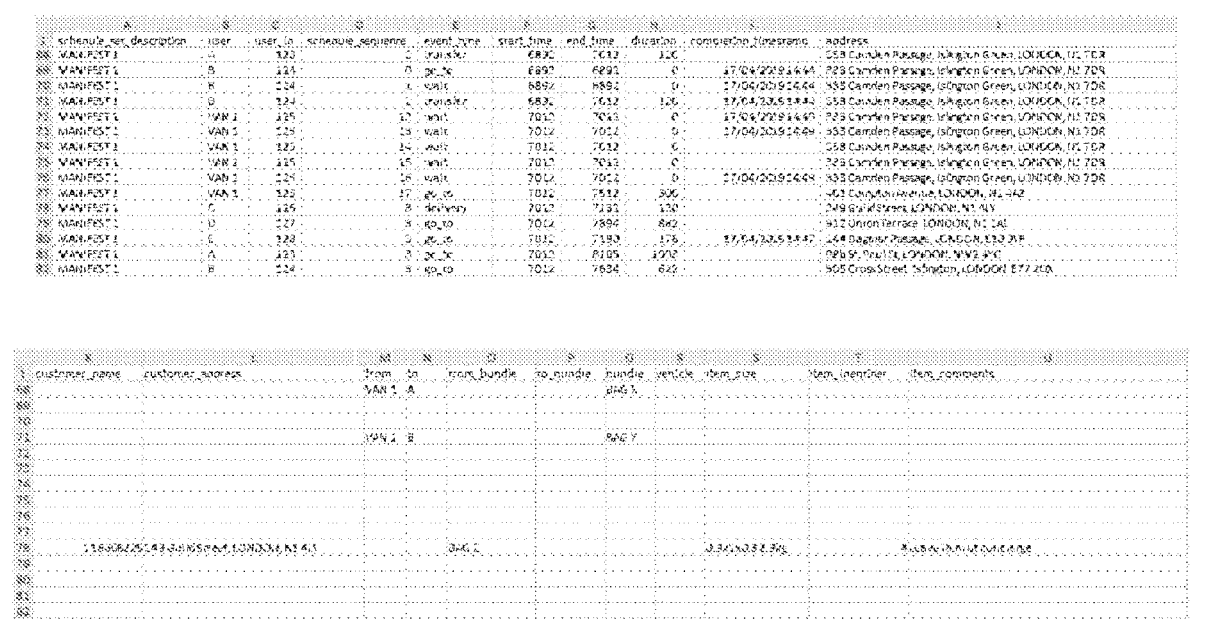

An example excerpt of a generated schedule is shown in FIG. 12, as displayed in a standard spreadsheet format. Columns A to J are shown on the left of the page, and columns K to U on the right of the page. The schedule may be generated in any tabular data format. For example, the schedule may be generated as .csv file, a tab-separated value file, or a space-separated value file. The shaded, left-most column contains unique line numbers for each entry in the schedule. The shaded, top-most row contains alphabetical identifiers for the columns of the schedule. These numerical and alphabetical identifiers are not included in the tabular schedule, but are provided as a feature within many examples of spreadsheet software (for example, Microsoft's Excel).

The first entry (line) in the schedule may be a header, which provides variable names indicating what the values in each column represents. In the schedule excerpt of FIG. 12, the header containing the variable names is contained in row 1. For readability, only a limited number of schedule entries are displayed. The example entries correspond to the entries of the schedule from an arbitrary starting point within that schedule; that is, the examples of FIG. 12 do not necessarily correspond to the very first entries of the schedule excerpt. Note that the given example addresses here and elsewhere do not correspond to real addresses but are fabricated for the purposes of providing an illustrative example.

The column entitled "schedule_set_description" (column A) contains a descriptive name of the schedule. The value may be user-determined or automatically generated. This may correspond to the name of the digital manifest from which the schedule has been generated. While the schedule excerpt of FIG. 12 suggests that just one digital manifest was used in the generation of this schedule (MANIFEST 1), multiple digital manifests may be used in the generation of a schedule.

The column entitled "user" (column B) contains the name of the user (delivery agent) or the vehicle to which the entry refers. User A, for example, is a different individual to user B. VAN 1, in this instance, is a vehicle (parent agent). Further, a vehicle may be operated by an individual who has their own user name.

The column entitled user_ID (column C) contains the unique identification of the user involved in this particular entry of the schedule. It may be that just one of the "user" and "user_ID" values are included in the schedule. In this way, the size of the schedule (in terms of necessary computational storage space) may be reduced.

The column entitled "schedule_sequence" (column D) contains an integer value denoting the number of the event for the particular user. The counter begins at a value of zero and increases by a value of one with each successive event for that user. For example, the first entry in the schedule excerpt (row 68) is the third event associated with user A.

The column entitled "event type" (column E) contains the title of the event that the entry describes. For example, the first entry of the schedule excerpt (line 68) indicates a "transfer" event is to occur: this involves the transfer of an item/bundle/delivery vehicle from one user/vehicle to another, and thus could involve the transfer of one vehicle (bike) to or from another (van) in which the first vehicle travels. As another example, the second entry (line 69) of the schedule excerpt indicates a "go_to" event is to occur: this involves the movement of the user/vehicle from one location to another. As yet another example, the third entry (line 70) of the schedule excerpt indicates a "wait" event is to occur: this involves waiting at the same location until another user/vehicle arrives in order to perform a successive event. As a final example, the eleventh entry (line 78) of the schedule excerpt indicates a "delivery" event is to occur: this involves the delivery of an item to a recipient (consumer). Other event types may be included. For example, a "pick_up" event may correspond to the collection of an item, for instance from a customer, to be transported back to the original supplier (i.e. returning an item) or to a van picking up compartments from the distributor.

The column entitled "start_time" (column F) contains the time at which the event of the entry is due to start. Here, this is displayed as a cumulative second counter relative to the anticipated commencement of the schedule (or, alternatively, relative to the creation of the schedule). It may alternatively be depicted using any means of conventional date and time notation.

The column entitled "end_time" (column G) contains the time at which the event is due to finish. Again, here this is displayed as a cumulative second counter relative to the anticipated commencement of the schedule (or, alternatively, relative to the creation of the schedule). It may alternatively be depicted using any means of conventional date and time notation. In the case that no time passes during the event, this value may be the same as the time_start value. For example, the finish time of a "wait" event may be understood to correspond to the time of the next, non-wait event. That is, a "wait" event is an instantaneous event, unless it has been modified by the durations service, as explained in more detail previously. In the example shown, a wait event has been added to the stop events for the van for each delivery agent. Zero duration wait events may be deleted from the schedule once the durations service has run, or may be retained for possible use in real-time adjustments.

The column entitled "duration" (column H) contains the time that the event (entry) is due to take. For example, a "transfer" event may be allocated a value of 120 as it is expected a user will take 120 seconds to perform the item/bundle/delivery vehicle transfer. Alternatively, a "transfer" event may be allocated a value based on the weight/dimensions of the item/bundle/delivery vehicle to be transferred. As discussed in the previous paragraph, a "wait" event is allocated a value of zero, at least initially. A "go_to" event may be allocated a value corresponding to the anticipated time required to reach the destination; this may be based on historical data of that particular user or address and/or may be calculated using map-data (for example, using address parsing and/or using AI algorithms to look at imagery and maybe even using secondary data sources such as estate agents adverts). Further, this value may consider, for example, the need to use a staircase/lift if the destination is not on the same level as the building entrance. Alternatively, a "go_to" event may be allocated a value of zero if the user is already at that destination (for example, following a "wait" event). A "delivery" event may be allocated a standard value of 120 as it is expected that a user will take 120 seconds to perform the delivery. Alternatively, a "delivery" event may be allocated a value based on historical delivery speed data of that particular user/agent/address. The duration value for an entry, in combination with the start_time value for the same entry, may be used to calculate the end_time value for the same entry. Therefore, to reduce schedule size, it may not be necessary to include all three time values in the schedule.

The column entitled "completion_timestamp" (column I) contains the time at which the event (entry) of the schedule is actually completed. This field is updated when it is detected—either through manual user input (for instance entry on the GUI of a mobile device) or through determination based on user location data (for example, through geofencing)—that the event has been completed. In this way, it is possible for others viewing the schedule to establish the status of the delivery schedule. Further, these values may be used to provide more accurate event duration estimates in future generated schedules.

The column entitled "address" (column J) contains the address at which the event (entry on a single line) is to occur. For example, in the first entry of the schedule excerpt (line 68), the transfer involving user A is to happen at the address "333 Camden Passage".

The column entitled customer_name (column K) contains the name or unique identifier of the customer to whom an item is to be delivered. A value is only provided in cases where the entry corresponds to a delivery event or a transfer event that involves the transfer or an individual item (i.e. in the initial packing of a bundle). In this schedule excerpt, the customer name is provided as a randomised string of number, but it may be that the full name of the customer is provided to enable personalised delivery of the item.

The column entitled "customer_address" (column L) contains the address to which the item is to be delivered. As with the customer name, a value is only provided in cases where the entry corresponds to a delivery event or a transfer event that involves the transfer of an individual item (for example, in the initial packing of a bundle).

The column entitled from (column M) contains the name of the location/vehicle/user from which the transfer is to occur. The column entitled to (column N) contains the name of the location/vehicle/user to which the transfer is to occur. A value is therefore only provided in cases where the entry corresponds to a transfer event. For example, the first entry of the schedule excerpt (line 68) indicates that the transfer is to occur from VAN 1 to user A.

The column entitled from_bundle (column O) contains the name of the bundle from which an item delivery is to occur. A value is only provided in cases where the entry corresponds to a delivery event of an individual item from a bundle. For example, the eleventh entry of the schedule excerpt (line 78) indicates that delivery is to occur and that the item to be delivered is stored in the bundle labelled BAG Z.

The column entitled to bundle (column P) contains the name of the bundle that is being transferred in transfer events involving the movement of an item between bundles or transfer events involving the initial packing of a bundle. A value is therefore only provided in cases where the entry corresponds to a transfer event.

The column entitled bundle (column Q) contains the name of the bundle that is being transferred in transfer events involving the movement of entire bundles between vehicles/users. For example, the first entry of the schedule excerpt (line 68) indicates that the bundle BAG X is to be transferred from VAN 1 to user A.

The column entitled vehicle (column R) contains the name of the vehicle that is being transferred in transfer events involving the movement of a vehicle from one vehicle to a user or to another vehicle. For example, it may be the case that a delivery van contains a delivery bicycle, which is to be transferred to a user who—until this point—has been on foot, or who is about to start work.

The column entitled item_size (column S) contains the physical dimensions and the mass of the item to which the entry (event) is directed. A value is only provided in cases where the entry represents either a delivery event or a transfer event that involves the transfer of an individual item (for example, in the initial packing of a bundle). For example, the eleventh entry of the schedule excerpt (line 78) indicates that the item that is to be delivered is 0.9×1×0.3 units in volume (each individual number here corresponds to a length in units of metres) and weighs 2.9 kg.

The column entitled item_identifier (column T) contains an identifier for a package/parcel such as a bar code.

The column entitled item_comments (column U) contains comments relevant to the item. These comments may be, for example, customer-supplied delivery instructions or comments noting the fragility of the item.

FIGS. 13 to 24 show GUIs used with invention embodiments. Features of the embodiments may be freely interchanged. Of course, if one of the agents is automated (such as a drone or robot or self-guided vehicle) then no GUI is required for that agent.

Figure 13:
FIG. 13 is a representative screenshot of a web-based GUI with a schedule for multiple users mapped highlighting individual events according to one example.

FIG. 13 is a screenshot of one screen of a web-based GUI according to one embodiment, illustrating a mapped delivery schedule for multiple users. It may be used by a manager at a central control, for example on a PC, or by a van parent agent, or even by a delivery agent. At the top of this example is a banner, which contains multiple clickable buttons. 1802 displays the name of the current schedule; the drop-down option displays a list of schedules that are available to load. 1804 displays the date of the current schedule; the calendar button brings a calendar into focus to enable the user to choose a schedule by date.

Icon 1806, on selection, loads the map screen, which will be described shortly. Icon 1808, on selection, loads an interface for managing digital item manifests. Icon 1810, on selection, loads an interface (screen) for viewing and managing schedules. Icon 1812, on selection, loads an interface for generating schedules. Icon 1814, on selection, loads an interface for providing detailed analytics relevant to the delivery. Icon 1816, on selection, loads an interface for viewing and editing the list of available vehicles. Icon 1818, on selection, loads an interface for viewing and editing the list of users and the user-vehicle assignments. Icon 1820, on selection, loads an interface for viewing and editing a list of orders (i.e. a list of individual items and their delivery address, recipient, etc.). Icon 1822, on selection, loads an interface for viewing and editing organisations (i.e. any warehouse addresses). Icon 1824, on selection, loads an interface for viewing the GUI's current user's preferences and provides functionality for logging out of the system.

The large map screen under the banner demonstrates a mapped delivery route, which indicates the scheduled route for any parent and delivery agents. For example, the lines (overlaying the roads of the map) indicate the routes as determined by a TSP algorithm during schedule generation for 7 different agents: 6 walkers (with a current position illustrated by a human icon) and 1 van and driver (with a current position illustrated by a van icon). Solid lines are used to represent any van's scheduled route; dashed lines are used to represent any biker's scheduled route (note that there are none displayed here); and dotted lines are used to represent any walker's scheduled route. Different colours may be used for the route of each agent to improve readability.

Each route interconnects selectable event markers for the relevant user. For example, an event marker containing a downwards arrow indicates that the user is scheduled to perform a delivery at this location. Similarly, a sideways double-headed arrow indicates that the user is scheduled to perform a transfer at this location. Finally, an event marker containing a circle is used to indicate the user is scheduled to wait at this location. Selecting an event marker creates a pop-up window with event details. Different colours may be used to indicate the current status of the event. For example, a green event marker may indicate that the event has been completed; a blue marker may indicate that the event is the current (i.e. the next to be completed) event for the user; and a grey marker may indicate that the event is yet to be completed (i.e. it is a future event in the agent's schedule). Additionally, icons representing such significant locations as the delivery warehouse or viable reload stations may be displayed.

Advantageously, it is possible to bring up further details of the event and/or user by clicking on the relevant icon.

By communicating with the delivery agents and/or any GPS units held by the delivery agents, it may be possible to update the agents' current locations and event statuses in real time. Additionally, functionality is provided to view only selected agents, to zoom in and out of the current view, pan between map locations, and modify the layering of the underlying map (for example, opting to view satellite images rather than graphical depictions of the area).

Figure 14:
FIG. 14 is a representative screenshot of a mobile phone-based GUI with the events of a single user mapped according to one example.

FIG. 14 is a screenshot of a mobile application-based GUI in a map view, illustrating only the events relevant for a particular user (the user operating the mobile phone). At the top and bottom of this example are banners, which contain multiple clickable buttons. Icon 1902, on selection, toggles the visibility of the scheduled routes and events of all other members of the current user's team. Icon 1904, on selection, highlights the user's scheduled stops on the map. Icon 1906, on selection, hides the user's scheduled stops on the map. Icon 1908, on selection, loads an interface providing an overview of the user's schedule. Icon 1910, on selection, indicates the progress of the user's delivery schedule, or changes the display to an event page with details of the event. Icon 1912, on selection, loads an interface providing access to the functionality of a connected smart device or wearable. Icon 1914, on selection, loads an interface for viewing and editing the user's settings.

Between the top and bottom banners is a map screen, which contains event markers for the users as previously described. Also indicated are the current locations of a van and van driver and of a station suitable for reloading the delivery agent's compartment. The current location of the user of the mobile phone may also be illustrated as a van or person or bike icon, for example. Functionality is provided to zoom in and out of the current view and to pan between map locations. Additionally, a navigated route between event markers may be provided.

Figure 15:
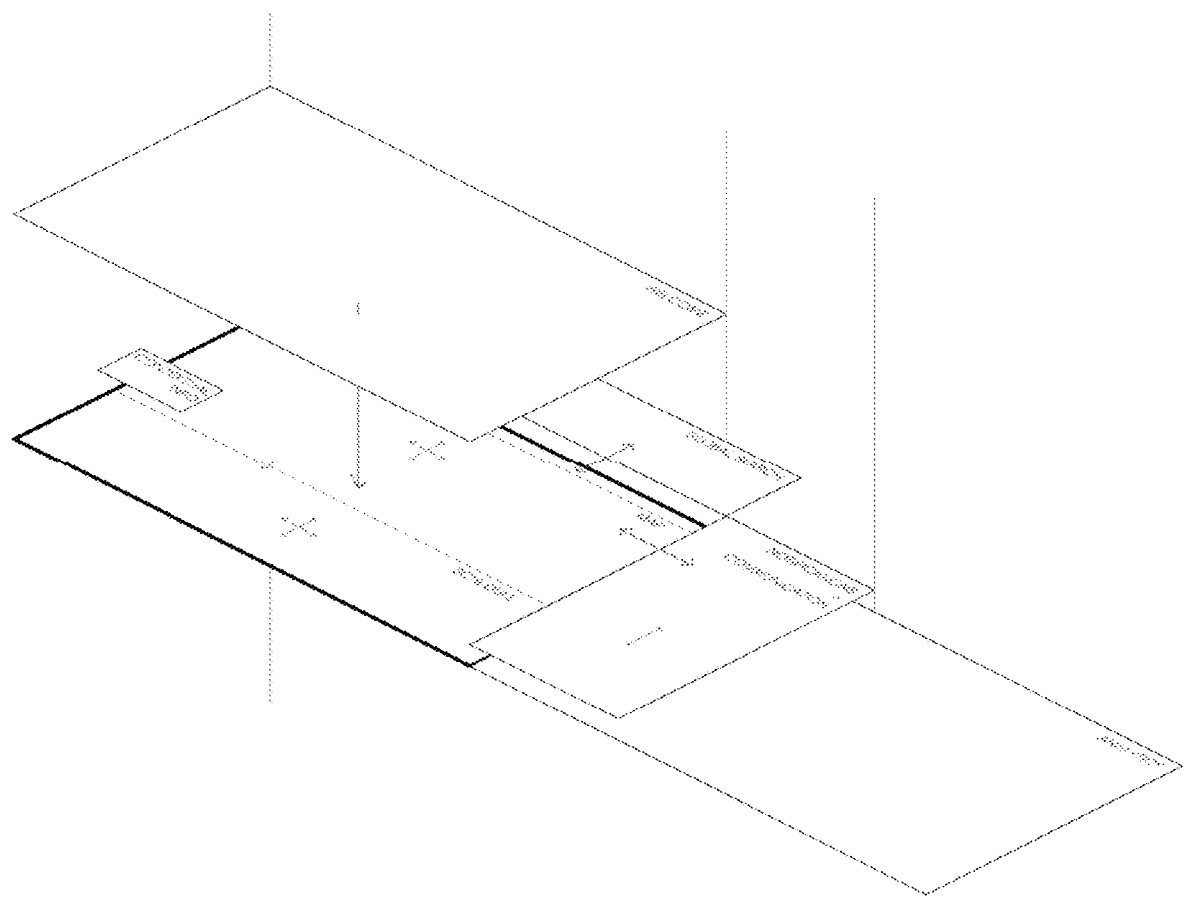
FIG. 15 depicts a mental model of a web interface for a fleet manager.

An alternative embodiment provides a cohesive set of different screens for a fleet manager, driver, and delivery agent, as shown in FIGS. 15 to 24. In this and the previous embodiment, colours are used consistently to identify different types of events, so that for example, a transfer is shown in purple, a go-to event in a different shade of blue for each type of agent (van, biker, walker), a delivery in green and a wait in grey. Pick ups may be shown in a further colour but are not depicted in these figures. Map elements follow the same colour scheme FIG. 15 depicts a mental model of a web interface for a fleet manager. The manager clicks through a welcome screen to a dashboard which has both a map view and a schedule view. The dashboard allows a global search and a pop-up of contextual information when an event or item is selected. Notifications and team communication may slide in from the side.

Analytics may be accessed separately in a series of pages. They may include visualisation of the impact of using multi-modal deliveries benchmarked against a van-only fleet. Also, a team leader board may be presented to quickly track performance as well as a live tracker of the day's deliveries as they happen. Delivery specific data may be visualised, for example to show percentage of on-time late and failed deliveries per person or over a time period. They may be flexibly filtered. Time analytics may track time taken for different stages of delivery, with flexible filtering. Personnel analytics may be provided with a page of data and visualisations per team member.

Figure 16:
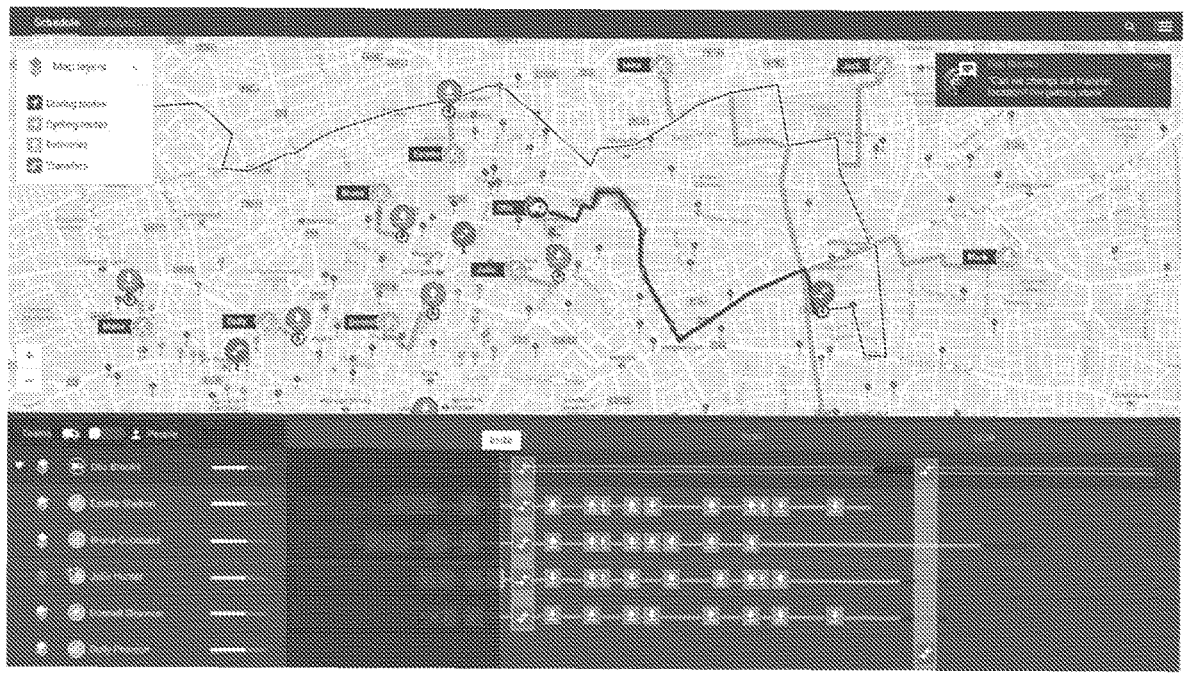
FIG. 16 shows the fleet-manager dashboard or overview page.

FIG. 16 shows the fleet-manager dashboard or overview page with an upper part having a map view and a lower part having a schedule view. Scheduled events are laid out on a timeline for each team member and transfer events connect team members vertically. Alternatively, the events may be shown on a joint timeline for a whole team (parent and delivery agents).

The map tracks team members (shown in their real-time positions by icons corresponding to their function in the team and names). Events and routes are shown as in the previous embodiment. By default, the map shows all active events and team members as well as scheduled deliveries in various states (scheduled, completed, failed) which are differentiated by colour. However, selecting an event or item will highlight or only show the relevant full route and agent(s) involved. Also, the map layers may be switched on and off using the window below the top banner at the top left of the screen.

The top banner allows the manager to toggle between the overview and analytics (not shown) and to access global search and notifications. A team message and its sender are displayed below the top banner on the right. Messages and alerts from the team as well as notifications on big changes or updates made by the system come in directly on top of the fleet manager's screen. These are persistent and need to be manually dismissed or viewed.

The divider between the map view and schedule view may be dragged vertically to allocate space.

Figure 17:
FIG. 17 shows the dashboard with a delivery event selected and below, various alternative event views.

FIG. 17 shows the dashboard with an event (in this case a delivery) selected by clicking on it on the map or schedule and below, various alternative event windows. An event window shows available information for the event and can be freely moved around the screen to avoid blocking important parts of the map. At the same time, the map highlights the scheduled journey of the item in the delivery, from the current time until the moment of delivery.

In the same way, a transfer may be selected on the schedule or map to surface an event window with available information. In this case, the map highlights all the team members' positions and routes involved in the transfer. The bottom row of windows in FIG. 17 shows different window layouts for a transfer, delivery, and for the three different types of go-to events for a biker, van driver and walker respectively. Each event includes an event type as a title, start and end times, team members involved, location, and for travel events, duration and distance. A transfer event also includes an indication of the compartment and item.

Figure 18:
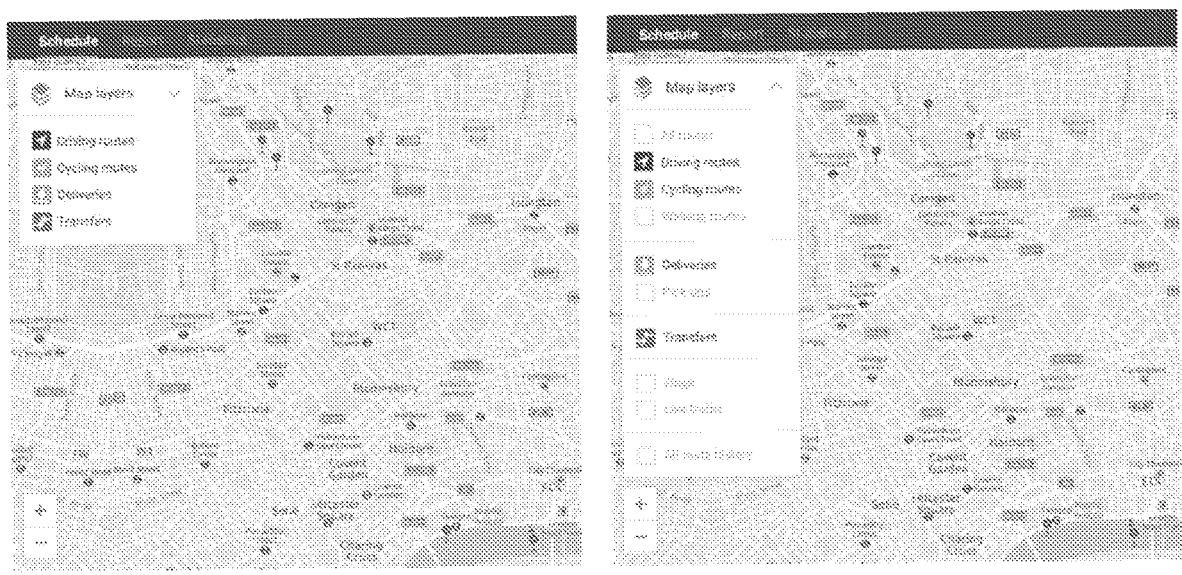
FIG. 18 shows map layers available to the fleet manager.

FIG. 18 shows map layers available to the fleet manager. Information layers on the map can also be manually customised. Event-related information as well as live traffic overlays, flags with comments created by the team in the field and historical route (and event) data can be shown.

Figure 19:
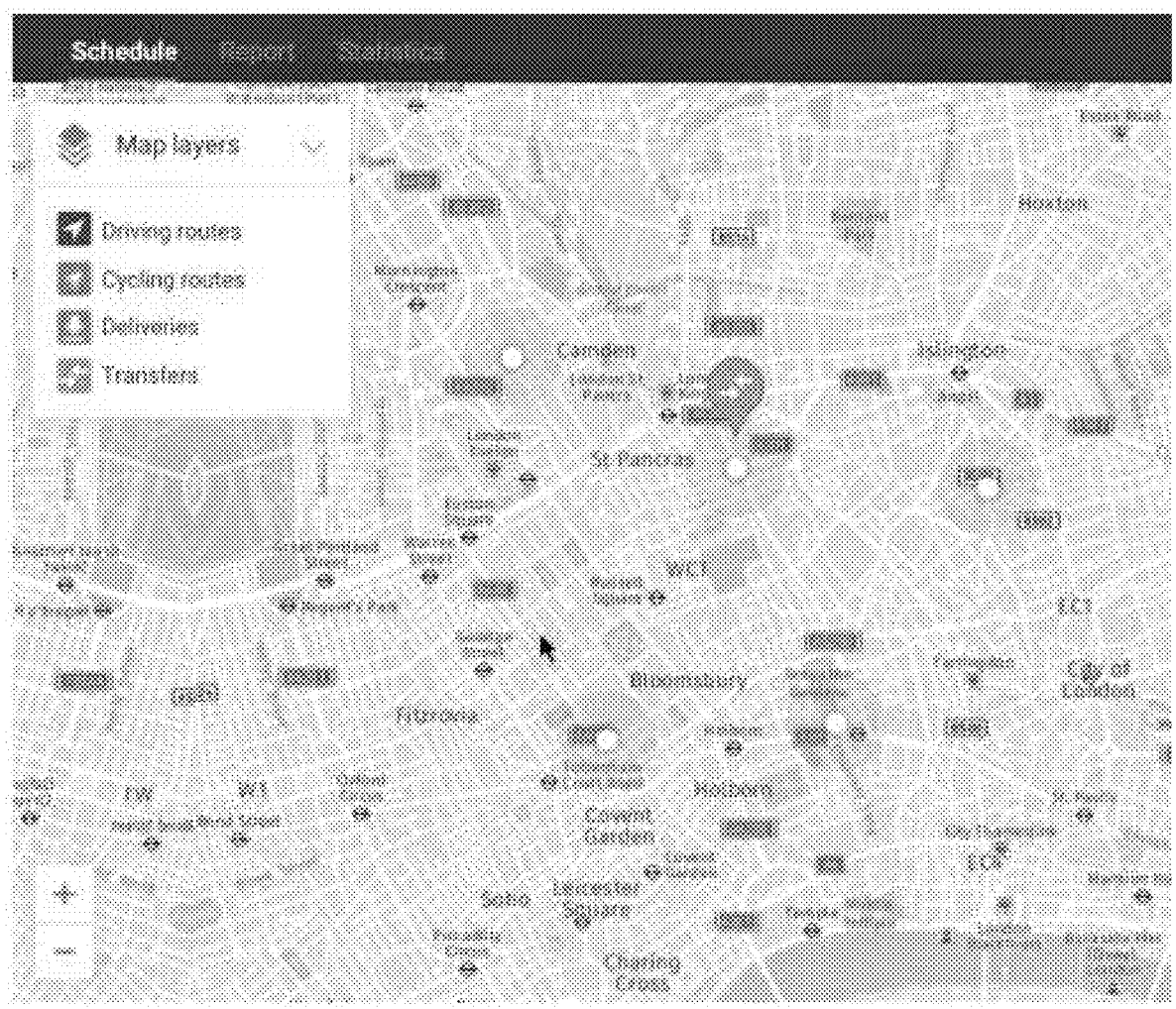
FIG. 19 is a map view demonstrating relocation of a transfer event.

FIG. 19 is a map view demonstrating relocation of a transfer event. The user clicks and holds the event on the map and it will pop out of its location to be moved around.

Previously successfully used locations nearby (for example within a predefined radius) will be displayed. If the user drop the transfer event on any of them (or an alternative location) the system will re-schedule all related team members and events. After confirming, the system will send out notifications to those affected.

Figure 20:
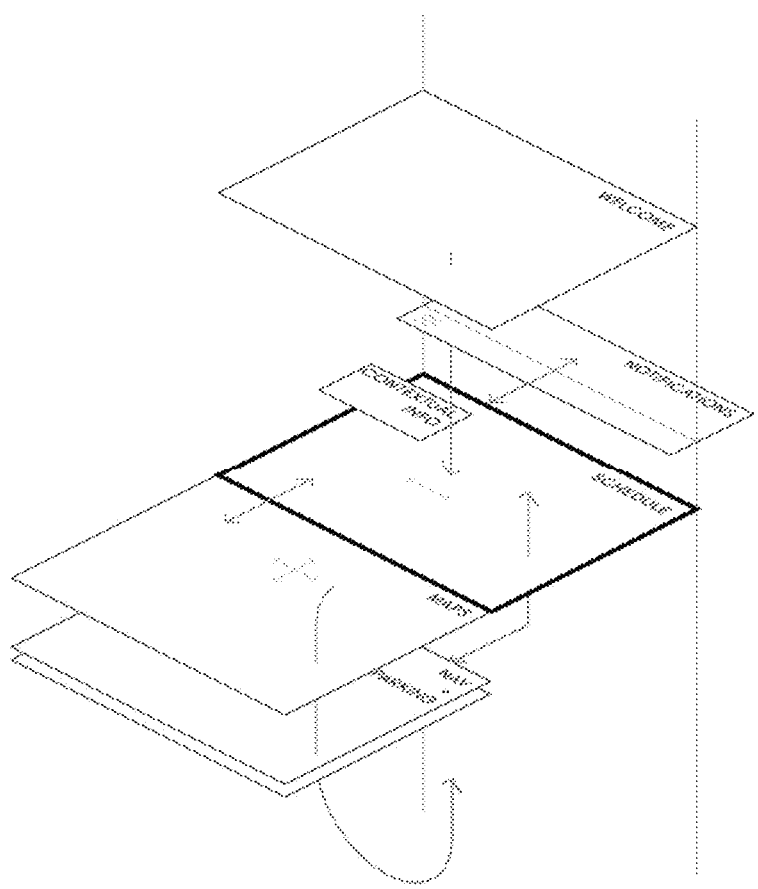
FIG. 20 depicts a mental model of a mobile interface for a van driver (parent agent)

FIG. 20 depicts a mental model of a mobile interface for a van driver, possibly on a tablet computer. The driver clicks through a welcome screen to a personal schedule for the delivery period. The driver can toggle to a map screen and through to navigation and parking information (which is layered on the top of the navigation or map screen as required). The personal schedule allows a pop-up of contextual information when an event or item is selected. Notifications and team communication may slide in from the top.

Figure 21:
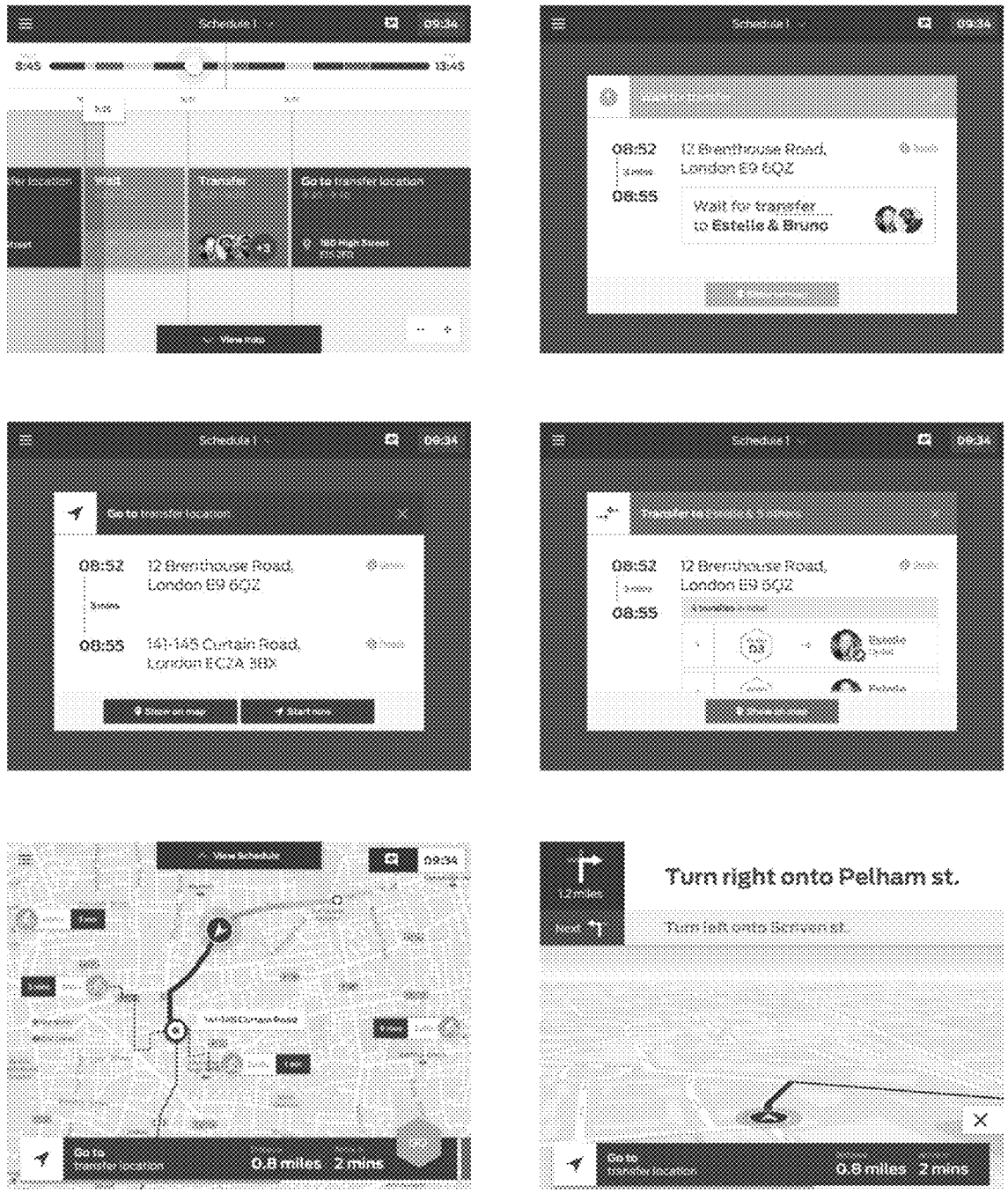
FIG. 21 depicts a series of screens for a van driver.

FIG. 21 depicts a series of screens. The top left screen is a personal schedule view, including a top banner with selectable buttons of a menu, title and message icon, and the time. Just below the top banner, a horizontal abstraction or scrub schedule in the form of a thin line allows quick navigation through the day's events, using the colours in the colour scheme to represent each type of event, and without any text. To either side of the scrub schedule the start and end of the delivery period is shown. A circular time marker shows the time/event viewed and can be moved by the user and a vertical bar position marker shows the current time/event.

The main part of the screen is occupied by the schedule based on a time sequence of events in the day. Only a section of these events is visible, for example a viewed event (indicated by the vertical position marker in the abstraction) and one or more events to either side of the viewed events. These events are shown as blocks in a thicker line from the colour scheme, including within them the event type, the time scheduled for the event, and potentially an address (for a travel or go-to event) or the team members involved (for a transfer). A vertical bar shows the viewed event/position and matches the position on the scrub schedule. The past events may be greyed out.

Below the blocks, there is a selectable button to switch to the map view.

The screen to the top right and the two middle screens show details of a scheduled event, accessed by clicking on the event in another screen such as the map screen or schedule screen. The top right screen is a wait screen, showing the address, start and end timings, time taken and an instruction to wait for the transfer, along with the names and photos of the delivery agents that the driver is waiting for.

The left middle screen depicts a go-to event with start and end timings, time taken, the starting and ending addresses (each with a selectable button to see more details) and at the bottom of the screen, selectable buttons to go to a map view or start now.

Similarly, the right middle screen is a transfer screen showing the address, start and end timings, time taken and identification of a bundle as well as of the delivery agent receiving the bundle. At the bottom of the screen, a selectable button is available to go to a map view.

The bottom left screens is a map view, including a top banner with selectable buttons to go to the schedule view, or send a message, and the time. The map covers the main part of the screen. Relevant team members are shown on the map with their names and a representation of the agent type. On the left hand map, four cyclists are en route to the same transfer location. A transfer in progress may be represented on the map by icons for the participants around the transfer location.

The driver's individual schedule is represented in a swipeable time sequence of cards at the bottom of the map view and in the colour scheme, with textual information such as distance, timing or pictures and agent type of team members in a transfer, and an icon for the event type as appropriate. Pressing a "Go" button on a go-to event card will start navigation for the current event.

The bottom right screen is a turn-by-turn navigation screen, with directions above a visualisation of the route and the event card provided as previously described.

If the current event is changed, the driver receives a strong notification overlaying the current screen, indicating a change and allowing the driver to access new navigation instructions by pressing a go button.

Figure 22:
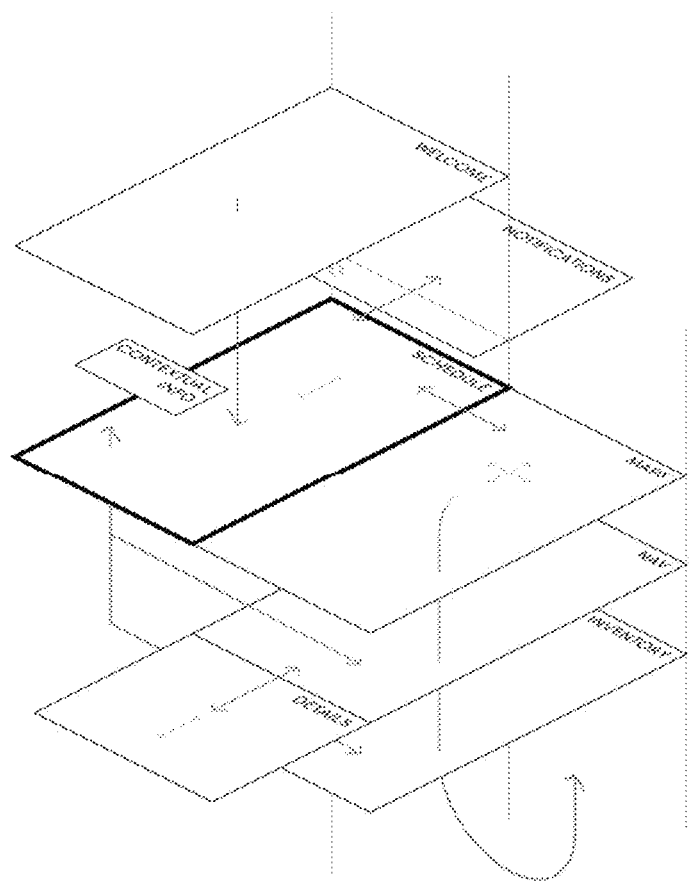
FIG. 22 depicts a mental model of a mobile interface for a cyclist or walker (delivery agent)

FIG. 22 depicts a mental model of a mobile interface for a cyclist or walker (delivery agent) for use on a smartphone, for example. The delivery agent clicks through a welcome screen to a personal schedule for the delivery period. The delivery agent can toggle to a map screen and through to navigation and also to an inventory screen. The personal schedule allows a pop-up of contextual information when an event or item is selected. Notifications and team communication may slide in from the top.

Figure 23:
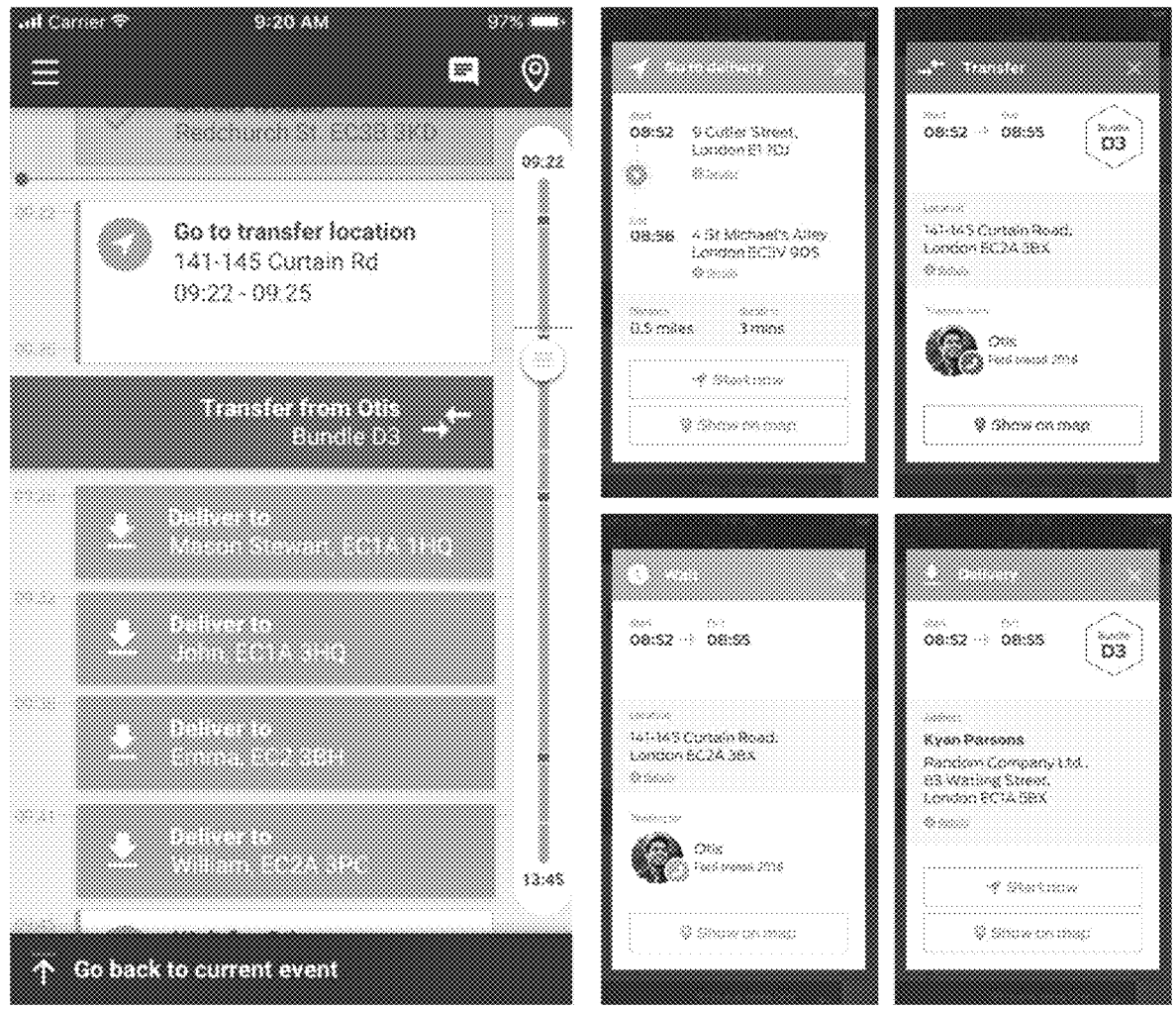
FIG. 23 depicts delivery agent screens.

FIG. 23 depicts the delivery agent screens, with the schedule screen shown to the left and four event screens shown to the right.

In the schedule screen, the same combination of a time sequence of events and an abstraction are used as for the driver, but in a different orientation. Below a top fixed banner with the date, a menu, messaging and the icon to swap to a map view, the scrollable schedule screen shown on the left is a high-level view of the individual schedule in a time-sequence of banners (or horizontal data strips) from the top of the screen to the bottom of the screen. An uppermost glimpsed banner indicates a completed event. The next event, at 9:22 is a travel event from the current location to a transfer location, to load a bundle of items. The current time is shown as a line above this first event. The next event is transfer of a bundle from parent agent "Otis" at 9.25.

The subsequent four banners are deliveries to different addresses, at 9.25, 9.32, 9.38 and 9.41. Travel events are not shown in this view. Finally, there is a wait (just shown) for a reload. At the bottom of the screen, an input field allows the user to return to the current event.

A vertical timeline to the right of the banners is provided as an abstract overview of the day's events, with a quick navigation handle in the form of a circular move button and also with a horizontal line indicating the current time/event.

The different kinds of events can be depicted in the different colours in the colour scheme as before and have different icons also as before. For example, a go to event icon may have an arrow icon pointing up to the right, a transfer event icon may have two horizontal arrows slightly vertically offset and pointing towards each other, a delivery event icon may have an arrow pointing downwards to a line and a wait event icon may be a simplified clock face. A pick-up event (not shown) may have an upwards arrow from a horizontal line.

The four screens shown on the right can be used for the different events, by tapping on the events in the overview screen shown to the left or on the map. Again they use the same colour and icon scheme. The upper left of the four screens is a go to screen for a delivery (as shown in the title banner) which in the top half gives more details of the route to a delivery with the starting and ending addresses, and below that the timing and distances. Two selectable buttons allow the user to start navigation instructions ("start now") or show the route on the map ("show on map").

The upper right of the four screens is a transfer screen (as shown in the title banner). This screen has the start and end times below the title, and the bundle and item number, followed by the address, then identification of the parent agent that the bundle is being transferred from (including a picture) and at the bottom of the screen, a selectable button to show the location on the map ("show on map").

The lower left of the four screens is a wait screen (as shown in the title banner). This screen again has the start and end times below the title, followed by the address, identification of the parent agent who is to arrive (including a picture) and at the bottom of the screen, a selectable button to show the location on the map ("show on map").

The lower right of the four screens is a delivery screen (as shown in the title banner). This screen has the start and end times below the title as before, and the bundle and item number, followed by the delivery address, and at the bottom of the screen, a "start now" selectable button to enter a completed delivery and an input field to show the location on the map ("show on map").

Figure 24:
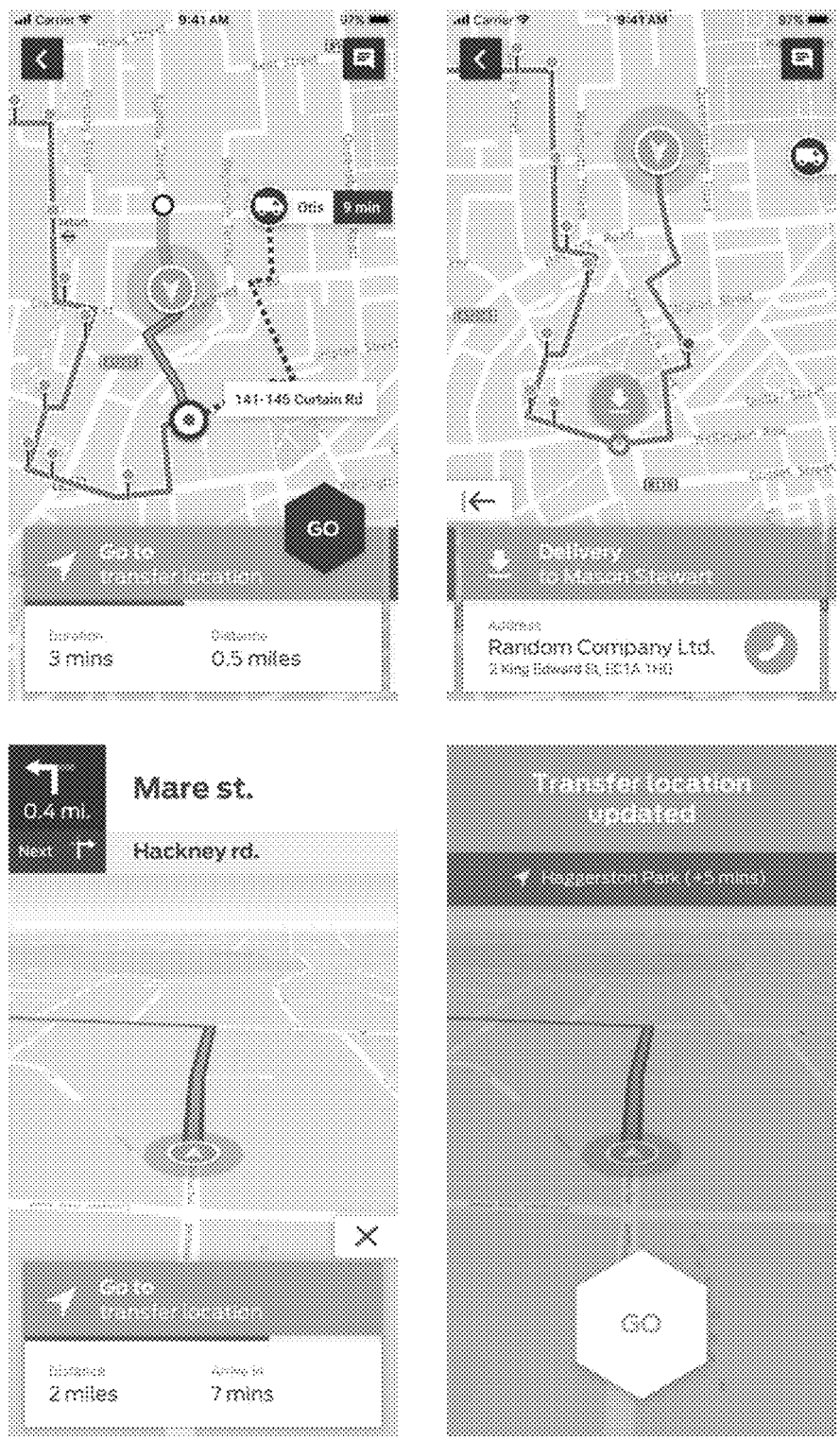
FIG. 24 shows further delivery agent screens.

FIG. 24 shows two map screens, a turn-by-turn navigation screen and an update screen for a transfer location. As before, the schedule is represented by swipe-able cards.

The top left screen is a map view, and includes a card for a go-to event at the bottom of the screen, with the title and colouring revealing that the event is a go to event to travel to a transfer location, as well as top selectable buttons to go back to the schedule view, or send a message icon, and the time and battery charge as usual. The map covers the main part of the screen. Relevant team members are shown on the map with their names and a representation of the agent type. In this case, the van driver is en route to the same transfer.

The delivery agent's individual schedule is represented in the swipe-able time sequence of cards at the bottom of the screen in the colour scheme, with textual information including distance and timing. Pressing a "Go" button on a co-to event card will start navigation for the current event.

The top right screen is a further map screen for a delivery, showing the delivery address in place of the distance and timing information.

The bottom left screen is a turn-by-turn navigation screen, with directions above a visualisation of the route and the event card provided as previously described.

If the current event is changed, the agent receives a strong notification as shown on the bottom right, overlaying the current screen, indicating a change and allowing the driver to access new navigation instructions by pressing a go button.

Figure 25:
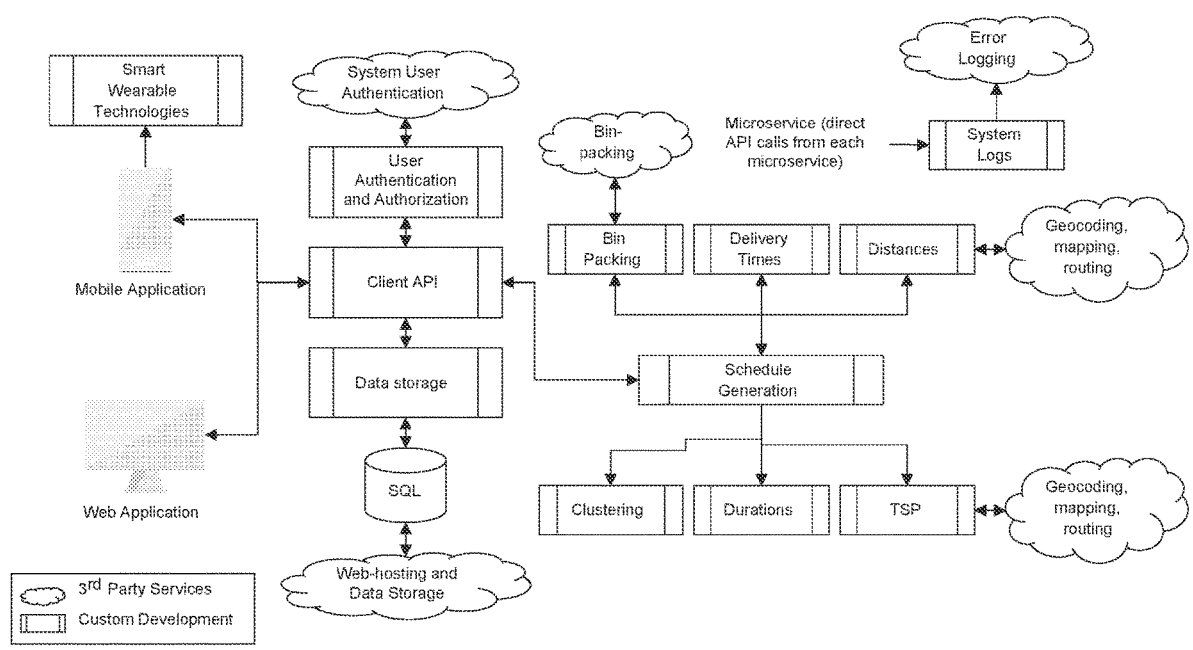
FIG. 25 is a high-level overview flowchart software system diagram according to one example.

FIG. 25 illustrates the software system architecture used for MoDe:Link with the modules necessary for execution of the software. On the left, the user applications are shown in the form of a web application (for use at a central control, for example) and a mobile application, with various different functionalities. The mobile application may utilise Mapbox, which provides in-app turn-by-turn navigation. There may be a link to a signalling device on a trolley or vehicle to aid the delivery agent (and passers-by) to see where the trolley or vehicle is to go) or to any smart wearable technologies, such as a smart jacket which provides navigational instructions/signals, for example by use of lighting and/or haptic devices on the jacket body and/or sleeves.

The client Application Programming Interface (API) links to data storage and via an SQL database to a web-hosting and data storage service such as Amazon Web Services. There is also a custom user authentication and authorization block with cloud authorization. Schedule generation is connected to the client API and to modules (microservices) used within the software which together create the schedule. Bin packing may use a 3D packing program on the cloud. Delivery Times and Distances are custom-built modules and Distances links into a geocoding, mapping and routing provider such as Graphhopper or HERE Maps. A Clustering module is also custom built and a Durations module may be provided to vary delivery time using data in the manifest. The custom-built TSP module refers to Graphhopper or another routing service.

Error logging may be provided by such a service as Splunk, which provides system logging on the cloud for the microservices.

Figure 26:
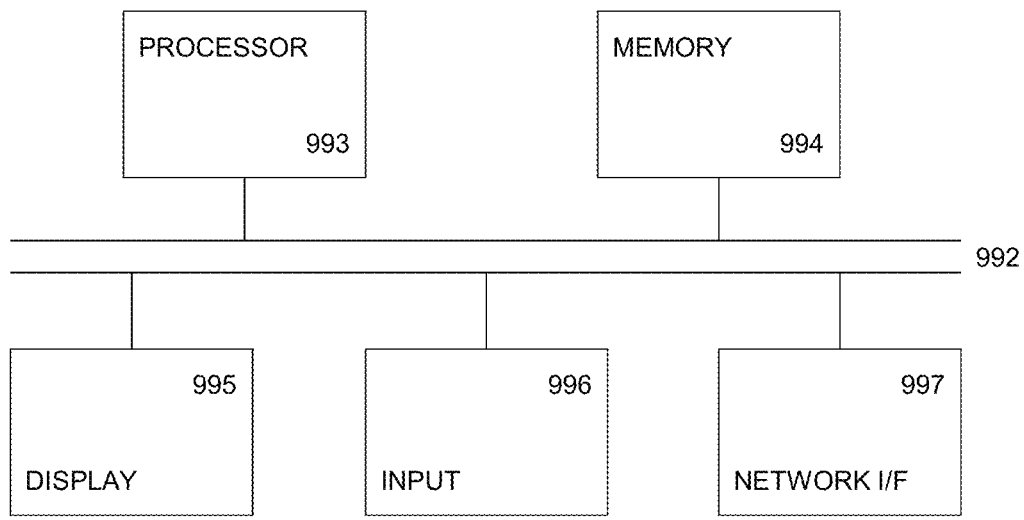
FIG. 26 is a diagram of suitable hardware for implementation of an invention example.

FIG. 26 is a block diagram of a computing device, such as a data storage server which embodies the present invention, and which may be used to implement a method of an embodiment of arranging delivery at a central control point. The computing device comprises a processor 993, and memory, 994. Optionally, the computing device also includes a network interface 997 for communication with other computing devices, for example with other computing devices of invention embodiments.

For example, an embodiment may be composed of a server, connected to the cloud and providing schedule generation and a client API, a web application using the client API running on the server or on a separate terminal and mobile devices, connected to the cloud and also using the client API. Optionally, the computing device also includes one or more input mechanisms such as a touchscreen or keyboard and mouse 996, and a display unit such as one or more display screens or monitors 995. The components are connectable to one another via a bus 992.

The memory 994 may include a computer readable medium, a term which may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions described here and in the claims.

The memory 994 stores data (such as records and scheduling information) being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The functionality described above may run on the processor 994 as appropriate and use memory 994.

The display unit 995 may display a representation of data stored by the computing device and may also display GUI components of the web or mobile application such as a cursor and dialog boxes and screens enabling interaction between a user and the programs and data stored on the computing device as explained herein. The input mechanisms 996 may enable a user to input data and instructions to the computing device.

The network interface (network I/F) 997 may be connected to a network, such as the Internet, and is connectable to other such computing devices (such as mobile devices using the mobile application) via the network. The network I/F 997 may control data input/output from/to other apparatus via the network. Other peripheral devices such as microphone, speakers, printer, power supply unit, fan, case, scanner, trackerball etc. may be included in the computing device.

Methods embodying the present invention may be carried out on a computing device such as that illustrated in FIG. 26. Such a computing device need not have every component illustrated in FIG. 26, and may be composed of a subset of those components. A method embodying the present invention may be carried out by a single computing device in communication with one or more data storage servers via a network. The computing device may be a data storage itself storing the scheduling information and navigation and other instructions to agents.

A method embodying the present invention may be carried out by a plurality of computing devices operating in cooperation with one another.

The invention claimed is:

1. A logistics apparatus for a user to assist delivery of items to recipients situated at different recipient locations, the logistics apparatus comprising memory and a processor to execute a graphical user interface (GUI) which is displayed on a display and linked to user input, the logistics apparatus comprising:
   access to an overall schedule of deliveries of the items to the recipients for agents acting as parent and delivery agents, with each item of the items represented as a respective record, wherein each parent agent of a plurality of parent agents has a respective parent cluster of records allocated to the each parent agent for a first transport stage along a respective route to a respective hub position, and respective records in each parent cluster of a plurality of parent clusters are further clustered according to recipient locations into one or more child clusters for a second transport stage, each child cluster of a plurality of child clusters being allocated to a first delivery agent which operates along a route from a first hub position of a first parent agent and delivers at the recipient locations, the first hub position located according to the recipient locations;
   wherein the overall schedule includes an individual schedule for each agent of the agents with events and locations and timings for the events, wherein the events include travel events in which an agent is travelling along a first route and stop events in which the agent is carrying out any of the following stop actions: delivering the items, transferring the items between the agents and waiting; and
   wherein the GUI is to control the display to display an individual schedule in the form of:

a schedule view in which a time sequence of the events is displayed, including an indication of a scheduled event timing; and a map view in the form of a map overlaid with stop event locations and travel event routes;

wherein when there is a first user selection via the user input of a first event of the events in the schedule view and/or when there is a second user selection via the user input of a second event of the events in the map view, the GUI is to control the display to display an event view including details of the first event and/or the second event, and wherein the logistics apparatus is for operation by the first parent agent or the first delivery agent, and wherein the schedule view is presented as an individual schedule page displayed on the display and the GUI is to accept a selection of a selectable map button to click through to the map view as a map page; and wherein events on the individual schedule page and/or the map page act as an event button to open the event view as an event page, and wherein the event page includes a first selectable button to click through to the map page and/or a second selectable button to start an event, wherein the second selectable button clicks through to a data page with a user input field for the first delivery agent to enter a notification when a first delivery has been completed and a user input field for a recipient to enter a signature, and wherein when there is a second delivery notified by the first delivery agent within a predetermined time of the first delivery, the GUI is operable to display a message asking the first delivery agent if the first delivery and the second delivery are part of a same delivery, and if the first delivery agent confirms, to copy a recipient signature across from the first delivery to the second delivery.

2. A logistics apparatus according to claim 1, wherein the GUI is to provide a set of one or more pages, each page of the set of one or more pages with one or more with selectable buttons to view further information and/or to send a message appearing as a pop-up window on another display of another logistics apparatus to other users.

3. A logistics apparatus according to claim 1, wherein the overall schedule comprises a pick-up event as a further stop action.

4. A logistic apparatus according to claim 1, wherein the individual schedule page includes both the time sequence as a viewed event and adjacent events and an abstraction of a schedule in a full delivery period including a marker, the abstraction allowing the user to move around the time sequence in the full delivery period by dragging the marker to an event of the events.

5. A logistics apparatus according to claim 1, wherein the map page includes a card displaying a selected event, and wherein the card is part of a string of cards representing the individual schedule, wherein the GUI is operable by the agent to view a next card to see an adjacent event.

6. A logistics apparatus according to claim 5, wherein on the map page, team members participating in the selected event are shown on the display as part of the card.

7. A logistics apparatus according to claim 1, wherein the logistics apparatus is for operation by a manager, and wherein the schedule view and the map view are presented together as a single overview page displayed on the display and the GUI is to accept a manager input to open the event view as a movable pop-up window, without a change of a page.

8. A logistics apparatus according to claim 7, wherein the schedule view shows timelines of individual agents and a visual connection between the timelines of the individual agents indicates a transfer involving the individual agents.

9. A logistics apparatus according to claim 7, wherein a transfer location in the map view is moveable to a different location and a network interface is operable to send the different location to agents' logistics apparatuses, and wherein previously successful transfer locations are displayed to assist the manager in selecting the different location.

10. A logistics apparatus according to claim 7, wherein a selection of a delivery on the schedule view highlights a route of a selected item for delivery on the map, a selection of a delivery on the map view highlights the route of the selected item for delivery on the map, a selection of a transfer event on the schedule view highlights agent positions and routes involved in a transfer, and a selection of a transfer event on the map view highlights the agent positions and the routes involved in the transfer.

11. A logistics apparatus according to claim 1, wherein a set of logistics apparatuses comprises two or more of the logistics apparatuses for agents.

12. A computer-implemented method of assisting delivery of items to recipients situated at different recipient locations using a logistics apparatus comprising memory and a processor to execute a graphical user interface (GUI) which is displayed on a display and linked to user input, the method comprising:

accessing an overall schedule of deliveries of the items to the recipients for agents acting as parent and delivery agents, with each item of the items represented as a respective record, wherein each parent agent of a plurality of parent agents has a respective parent cluster of records allocated to the each parent agent for a first transport stage along a respective route to a respective hub position, and respective records in each parent cluster of a plurality of parent clusters are further clustered according to recipient locations into one or more child clusters for a second transport stage, each child cluster of a plurality of child clusters being allocated to a first delivery agent which operates along a route from a first hub position of a first parent agent and delivers at the recipient locations, the first hub position located according to the recipient locations;

accessing an individual schedule included in the overall schedule, an individual schedule being provided for each agent of the agents with events and locations and timings for the events, wherein the events include travel events in which an agent is travelling along a first route and stop events in which the agent is carrying out any of the following stop actions: delivering the items, transferring the items between the agents and waiting; and the GUI controlling the display to display:

a schedule view in which a time sequence of the events is displayed, including an indication of a scheduled event timing; and a map view in the form of a map overlaid with stop event locations and travel event routes;

wherein the user input accepts a first user selection of a first event of the events in the schedule view and/or the user input accepts a second user selection of a second event of the events in the map view, and the GUI controls the display to display an event view including details of the first event and/or the second event, and wherein the logistics apparatus is for operation by the first parent agent or the first delivery agent, and wherein the schedule view is presented as an individual schedule page displayed on the display and the GUI is to accept a selection of a selectable map button to click through to the map view as a map page; and wherein events on the individual schedule page and/or the map page act as an event button to open the event view as an event page, and wherein the event page includes a first selectable button to click through to the map page and/or a second selectable button to start an event, wherein the second selectable button clicks through to a data page with a user input field for the first delivery agent to enter a notification when a first delivery has been completed and a user input field for a recipient to enter a signature, and wherein when there is a second delivery notified by the first delivery agent within a predetermined time of the first delivery, the GUI is operable to display a message asking the first delivery agent if the first delivery and the second delivery are part of a same delivery, and if the first delivery agent confirms, to copy a recipient signature across from the first delivery to the second delivery.

\* \* \* \* \*